(12) United States Patent
Barwick et al.

(10) Patent No.: US 8,597,736 B2
(45) Date of Patent: Dec. 3, 2013

(54) METHOD FOR PRODUCING A GRAFTED POLYMER COATING AND SUBSTRATES FORMED IN ACCORDANCE WITH THE METHOD

(75) Inventors: David Barwick, Durham (GB); Declan Oliver Hastings Teare, Durham (GB); Jas Pal Singh Badyal, Wolsingham (GB)

(73) Assignee: Surface Innovations Ltd., Wolsingham, County Durham (GB)

( * ) Notice: Subject to any disclaimer, the term of this patent is extended or adjusted under 35 U.S.C. 154(b) by 1113 days.

(21) Appl. No.: 12/085,986

(22) PCT Filed: Mar. 15, 2006

(86) PCT No.: PCT/GB2006/000922
§ 371 (c)(1),
(2), (4) Date: Jan. 6, 2010

(87) PCT Pub. No.: WO2006/097719
PCT Pub. Date: Sep. 21, 2006

(65) Prior Publication Data
US 2010/0240827 A1 Sep. 23, 2010

(30) Foreign Application Priority Data
Mar. 16, 2005 (GB) .................................. 0505367.3

(51) Int. Cl.
*C08F 2/46* (2006.01)
*C08J 7/18* (2006.01)
*B32B 9/04* (2006.01)

(52) U.S. Cl.
USPC ..................... 427/488; 427/255.6; 428/411.1

(58) Field of Classification Search
USPC ............................. 427/488, 255.6; 428/411.1
See application file for complete search history.

(56) References Cited

U.S. PATENT DOCUMENTS

| 4,448,850 A | * | 5/1984 | Upson et al. ............... 428/510 |
| 5,013,338 A | * | 5/1991 | Anand et al. ................... 96/4 |

(Continued)

FOREIGN PATENT DOCUMENTS

| JP | 4202441 | 1/1995 | ............... C08J 7/18 |
| WO | WO 0029548 | 11/1999 | ............... C12N 5/00 |

(Continued)

OTHER PUBLICATIONS

Teare et al., Rapid Polymer Brush Growth by TEMPO-Mediated Controlled Free-Radical Polymerization from Swollen Plasma Deposited Poly(maleic anhydride) Initiator Surfaces, Langmuir, 2005, 21, 10818-10824.*

(Continued)

*Primary Examiner* — Katherine A Bareford
*Assistant Examiner* — James M Mellott
(74) *Attorney, Agent, or Firm* — Head, Johnson & Kachigian, P.C.

(57) ABSTRACT

A method for producing polymer coatings by surface initiated polymerization from a plasma deposited coating is provided. The modification of surfaces by polymer attachment is a versatile and efficient means of controlling interfacial properties, such as surface energy (i.e. wetting behavior), permeability, bio-activity, and chemical reactivity. The present invention provides a method whereby a plasma deposited coating is applied to a substrate and the polymer coating formed by surface initiated polymerization is formed on the coating rather than the substrate itself. This means that the growth of the polymer using the grafting from procedure can be performed efficiently and independently of the substrate from.

22 Claims, 12 Drawing Sheets

(56) References Cited

U.S. PATENT DOCUMENTS

| | | | | |
|---|---|---|---|---|
| 5,723,219 | A | * | 3/1998 | Kolluri et al. ............... 428/411.1 |
| 5,876,753 | A | | 3/1999 | Timmons et al. ......... C08F 2/46 |
| 6,528,291 | B1 | | 3/2003 | Chow et al. ............ C12N 11/14 |
| 7,714,075 | B1 | * | 5/2010 | Le et al. ......................... 525/244 |
| 2003/0088028 | A1 | * | 5/2003 | Kambouris et al. .......... 525/242 |
| 2006/0257558 | A1 | * | 11/2006 | Nomura ......................... 427/162 |

FOREIGN PATENT DOCUMENTS

| | | | |
|---|---|---|---|
| WO | WO 03/046562 | 6/2003 | |
| WO | WO03101621 | 11/2003 | ............... B05B 5/00 |
| WO | WO 03101621 A3 | * 3/2004 | |

OTHER PUBLICATIONS

Barwick, David C. (2004) Pulsed plasma chemical functionalization of solid surfaces, Doctoral thesis, Durham University. Available at Durham E-Theses Online: http://etheses.dur.ac.uk/3113/.*
Hawker et al., New Polymer Synthesis by Nitroxide Mediated Living Radical Polymerizations, Chem. Rev. 2001, 101, 3661-3668.*
Kurosawa et al., Synthesis of tethered-polymer brush by atom transfer radical polymerization from a plasma-polymerized-film-coated quartz microbalance and its application from immunoensors, Biosensors & Bioelectronics, pp. 1165-1176, Jul. 24, 2004.*
Schiller et al., Chemical Structure and Properties of Plasma-Polymerized Maleic Anhydride Films, Chem. Mater. 2002, 14, 234-242.*
Tsujii et al., Fabrication of patterned high-density polymer graft surfaces. II. Amplification of EB-patterned initiator monolayer by surface-initiated atom transfer radical polymerization, Polymer 43 (2002) 3837-3841.*
Bouaidat et al., Plasma-polymerized coatings for bio-MEMS applications, Sensors and Actuators A. 110 (2004) 390-394.*
Adleman, Leonard M.: "Molecular Computation of Solutions to Combinatorial Problems", Nov. 11, 1994; pp. 1021-1024.
Frutos, A.G., et al.; "Nucleic Acids Research", 1997, pp. 4748-4757.
Debouck, C., et al; "DNA Microarrays in Drug Discovery and Development", Jan. 1999; vol. 21 Nature Genetics Supplement, pp. 48-49.
Van't Veer, L.J., et al; "Gene Expression Profiling Predicts Clinical Outcome of Breast Cancer", Jan. 31, 2002, Nature vol. 415, pp. 530-536.
McGlennen, Ronald C.; "Miniaturization Technologies for Molecular Diagnostics", 2001, Clinical Chemistry, pp. 393-402.
Manolache, S., et al; "Synthesis of Nanoparticles Under Cold-Plasma Conditions", 2000, Journal of Photopolymer Science and Technology, vol. 13, pp. 51-61.
Hongquan, Jiang, et al; "Plasma-Enhanced Deposition of Silver Nanoparticles Onto Polymer and Metal Surfaces for The Generation of Antimicrobial Characteristics", 2004, Journal of Applied Polymer Science, vol. 93, pp. 1411-1422.
March, J., "Advanced Organic Chemistry $4^{th}$ Ed.", 1992.
Zammateo, N., et al.; "Comparison Between Different Strategies of Covalent Attachment of DNA to Glass Surfaces to Build DNA Microarrays", 2000, Analytical Biochemistry, pp. 143-150.
Pitt, W.G., et al.; "Attachment of Hyaluronan to Metallic Surfaces", 2004, Journal of Biomedical Materials Research Part A, pp. 95-106.

Duman, M., et al,; "A New Approach for Immobilization of Oligonucleotides Onto Piezolectric Quartz Crystal for Preparation of a Nucleic Acid Senso for Following Hybridization", 2003, Biosensors and Bioelectronics, pp. 1355-1363.
Terlingen, J., et al.; "Introduction of Functional Groups on Polyethylene Surfaces by a Carbon Dioxide Plasma Treatment", 1995, Journal of Applied Polymer Science, vol. 57, pp. 969-982.
Greisser, H., et al.; "Surface Immobilization of Synthetic Proteins Via Plasma Polymer Interlayers", 1999, Mat. Res. Soc. Symp. Proc., vol. 544, pp. 9-20.
Gong, X., et al.; "Surface Immobilization of Poly(ethylene Oxide): Structure and Properties", 2000, Journal of Polymer Science B: Plymer Physics, pp. 2323-2332.
Chen, Q., et al.; "Plasma Activation of Carbon Nanotubes for Chemical Modification", 2001, J. Phys. Chem B, pp. 618-622.
McLean, K., et al,; "Method of Immobilization of Carboxymethyl-Dextran Affects Resistance to Tissue and Cell Colonization", 2000, Colloids and Surfaces B: Biointerfaces, pp. 221-234.
Yasuda, H., et al.; "Plasma olymerization Investigated by the Substrte Temperature Dependence", 1985, Journal of Polymer Science, vol. 23, pp. 87-106.
Panchalingam, V., et al.; "Molecular Tailoring of Surfaces Via Pulsed RF Plasma Depositions", 1994, Appl. Polym. Sci., pp. 123-141.
Han, L.M., et al.; "Ring Retention via Pulsed Plasma Polymerization of Heterocyclic Aromatic Compounds", 1998, Chem. Matter, pp. 1422-1429.
Han, L., et al.; "Pulsed-Plasma Polymerization of 1-Vinyl-2-Pyrrolidone: Synthesis of a Linear Polymer", Journal of Polymer Science, pp. 3121-3129.
Savage, C., et al.; "Molecular Control of Surface Film Compositions via Pulsed Radio-Frequency Plasma Deposition of Perfluoropropylene Oxide", 1991, Chem. Mater., pp. 575-577.
Leich, M., et al.; "Pulsed Plasma Polymerization of Benzaldehyde for Retention of the Aldehyde Functional Group", 1998, Macromolecules, pp. 7618-7626.
Teare, D.O.H. et al: "Rapid Polymer Brush Growth by Tempo-Mediated Controlled Free-Radical Polymerization from Swollen Plasma Deposited Poly(maleic anhydride) Initiator Surfaces", Oct. 5, 2005.
Teare, D.O.H. et al: "Substrate-Independent Approach for Polymer Brush Growth by Surface Atom Transfer Radical Polymerization", Oct. 8, 2005.
Kurasawa, S. et al: "Synthesis of Tethered Polymer Brush by Atom Transfer Radical Polymerization From a Plasma-Polymerized-Film-Coated Quartz Crystal Microbalance and its Application for Immunosensors", Dec. 15, 2004, pp. 1165-1176.
Boyes, S.G., et al: "Polymer brushes-surface immobilized polymers", Oct. 10, 2004, pp. 1-12.
Yu, W.H., Kang, E.T., Neoh, K.G.: "Controlled grafting of comb copolymer brushes on PTFE films by surface-initiated living radical polymerization", Dec. 7, 2004, pp. 450-456.
Andruzzi, L., et al: "Control of surface properties using fluorinated polymer brushes produced by surface-initiated controlled radical polymerization", Oct. 28, 2004, pp. 10,498-10,506.
Christopher L. Rinsch et al: "Pulsed Radio Frequency Plasma Polymerization of Allyl Alcohol: Controlled Deposition of Surface Hydroxyl Groups", Langmuir, vol. 12, No. 12, Jan. 1, 1996, pp. 2995-3002, American Chemical Society, United States of America.

* cited by examiner

METHOD FOR PRODUCING A GRAFTED POLYMER COATING AND SUBSTRATES FORMED IN ACCORDANCE WITH THE METHOD

CROSS-REFERENCES TO RELATED APPLICATION

This application is the U.S. National Phase of PCT Application No. GB2006/000922 filed 15 Mar. 2006, which claims priority to British Application No. 0505367.3 filed 16 Mar. 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of Invention

This invention relates to a method for producing polymer coatings by surface initiated polymerization from plasma deposited films.

The modification of solid surfaces by polymer attachment is a versatile and efficient means of controlling interfacial properties such as surface energy (i.e. wetting behavior), permeability, bio-activity, and chemical reactivity. Benefits that may accrue to an article as a consequence of a polymer coating include, but are not limited to, chemical sensing ability, wear resistance, gas barrier, filtration, anti-reflective behavior, controlled release, liquid or stain resistance, enhanced lubricity, adhesion, protein resistance, biocompatibility, the encouragement of cell growth and the ability to selectively bind biomolecules. A novel, substrate-independent methodology for producing such films is hence a useful and innovative addition to the art.

The growth of polymer chains from surface bound initiator groups, the so-called "grafting from" method, is a long established means of producing densely functionalized, well-ordered, polymer coatings. Popularly practiced variants of this polymer coating paradigm include Atom Transfer Radical polymerisation (ATRP), Iniferter polymerisation, nitroxide mediated stable free-radical polymerisation (using compounds such as TEMPO), dithioester based reversible addition-fragmentation chain transfer (RAFT), and surface-initiated radical polymerisation from immobilized azobisbatyronitrile type initiators. Such "grafting from" chemistries may be implemented in the gas phase, organic solvents, the aqueous phase, and in super-critical solvents as are known and described in the art.

Alternative "grafting to" techniques, where preformed polymer chains are bound to the substrate, by contrast, often yield comparatively poor grafting densities due to diffusional and steric limitations at the surface binding sites.

Traditional methods for preparing the immobilized initiator groups required by "grafting from" methods suffer from being complex, multi-step, and substrate specific. No genuinely universal means of rendering any article or surface amenable to a variety of "grafting from" techniques can be said to exist. The invention of this application relates to the use of plasma polymerization to deposit polymer films that can be used as precursors for surface initiated polymerization procedures. Thus removing the dependence on substrate surface chemistry of this methodology.

It is known to use plasmas for the deposition of polymeric coatings onto a range of surfaces. The technique is recognized as being a clean, dry, energy and materials efficient alternative to standard wet chemical methods. Plasma polymers are typically generated by subjecting a coating-forming precursor to an ionising electric field under low-pressure conditions. Although atmospheric-pressure and sub-atmospheric pressure plasmas are known and utilized for this purpose in the art. Deposition occurs when excited species generated by the action of the electric field upon the precursor (radicals, ions, excited molecules etc.) polymerize in the gas phase and react with the substrate surface to form a growing polymer film.

However, it has been noted that the utility of plasma deposited coatings is often compromised by excessive fragmentation of the coating forming precursor during plasma processing. This problem has been addressed in the art by pulsing the applied electrical field in a sequence that yields a very low average power thus limiting monomer fragmentation and increasing the resemblance of the coating to its precursor (i.e. improving "monomer retention").

Precise conditions under which the plasma polymerization takes place in an effective manner will vary depending upon factors such as the nature of the polymer, the substrate etc. and can be determined using routine methods. In general, however, polymerization is suitably effected using vapors of compounds selected for their ability to initiate "grafting from" polymerization, at pressures of from 0.01 to 10 mbar, most suitably at about 0.2 mbar.

A glow discharge is then ignited by applying a high frequency voltage, for example at 13.56 MHz. The applied fields are suitably of average power of up to 50 W. Suitable conditions include pulsed or continuous fields, but are preferably pulsed fields. The pulses are applied in a sequence which yields very low average powers, for example of less than 10 W and preferably of less than 1 W.

Examples of such sequences are those in which the power is on for 20 µs and off for periods from 1000 µs to 20000 µs.

These fields are suitably applied for a period sufficient to give the desired coating. In general, this will be from 30 seconds to 60 minutes, preferably from 2 to 30 minutes, depending upon the nature of the plasma polymer precursor and the substrate etc.

The aim of the present invention is to allow the growth of a polymer material, particularly using "grafting from" techniques in an efficient manner and in a manner which allows the polymer material to be grown and acquired on the substrates such that the actual form of the substrate material does not necessarily influence or restrict the growth of the polymer as is the case in conventional methods.

SUMMARY OF THE INVENTION

In a first aspect of the invention there is provided a method for applying a surface initiated polymer to a substrate wherein the method includes the step of forming a precursor coating onto at least part of a surface of the substrate using plasma polymerization to deposit a polymer coating on the substrate and then performing a procedure to form a polymer layer grown on the coating using initiator groups from the coating.

Thus, in accordance with the present invention there is provided a method of coating a sample with a polymer layer grown using a "grafting from" procedure from surface immobilized initiator groups that have been prepared by, or via, plasma deposition. Particularly, suitable plasma polymerized precursor layers are those that can be directly utilized as a source of immobilized initiator groups for the growth of the "grafted from" polymer layer.

An example of this aspect of the method is the direct growth of living polymer brushes by Atom Transfer Radical Polymerization (ATRP) from pulsed plasma polymer coatings of 4-vinylbenzyl chloride, 2-bromoethylacrylate or allyl bromide.

A further example of this aspect of the method is the direct growth of polymer brushes by nitroxide mediated stable free-radical polymerization from plasma polymers possessing stable free radical functionality, such as pulse plasma deposited maleic anhydride.

In one embodiment of the method, the plasma polymer coating is further derivatised to form the specific immobilized-initiator groups required for subsequent participation within such "grafting from" polymerization procedures as are known in the art. One example of said aspect of the method is the pulsed plasma polymerization of 4-vinylbenzyl chloride or 2-bromoethylacrylate followed by derivatisation with sodium diethyldithiocarbamate. The dithiocarbamate groups produced by this derivatisation step are capable of initiating the production of quasi-living polymer brushes from a variety of monomers (including but not limited to, methyl methacrylate and polystyrene) by photochemical surface Iniferter polymerization.

The use of plasmas within the method of the invention to produce the immobilized initiator sites required for surface graft-polymerization renders a variety of "grafting from" coating techniques universally applicable to a vast range of surfaces and articles. The prior art for methodologies such as surface ATRP, surface Iniferter polymerization, nitroxide mediated stable free-radical polymerisation, and surface polymerisation from immobilized azobisbatyronitrile type initiators, uses techniques limited to a comparatively limited range of wet-chemically derivatised substrates such as gold coated with thiol Self Assembled Monolayers (SAMs), silicon coated with silane coupling agent SAMs, hydroxyl terminated resins derivatised with 2-bromoisobutrylbromide, and cellulosic surfaces reacted with chloromethylphenyl functionalities.

Furthermore, the amenability of plasma deposition techniques to spatial patterning (by means that include masking) confers an additional degree of regio-selective control to the subsequent "grafting from" coating procedures.

Suitable plasmas for use in the method of the invention include continuous wave and pulsed non-equilibrium plasmas such as those generated by radio frequencies, microwaves, audio-frequencies or direct current (DC). They may operate at atmospheric or sub-atmospheric pressures as are known in the art. The coating precursor may be introduced into the plasma as a vapor or an atomized spray of liquid droplets (WO03101621, Surface Innovations Limited).

In a preferred embodiment of the invention the plasma used to deposit the plasma polymer precursor to the "grafting from" procedure is a non-equilibrium radio frequency (RF) glow discharge wherein the gas pressure may be 0.01 to 999 mbar and the applied average power is, for example, between 0.01 W and 10,000 W. Of especial utility for the method are low-pressure radiofrequency glow discharges, ignited at 13.56 MHz, that are operated at pressures between 0.01 and 10 mbar. The applied fields may be pulsed or continuous fields but are preferably pulsed fields. The pulses are preferably applied in a sequence that yields a very low average power. Examples of such sequences are those in which the plasma is on for 20 µs and off from 1000 µs to 20000 µs.

The plasma may comprise the plasma polymer coating precursor (commonly an organic monomeric compound) on its own. Suitable plasma polymer coating precursors preferably either have the capability to act directly as an initiator layer for a surface bound polymerisation technique (e.g. ATRP) or may be rendered into an initiator layer by a suitable derivatisation step (e.g. by reaction with sodium diethyldithiocarbamate or an azobisbatyronitrile type initiator).

In alternative embodiments of the invention, materials additional to the plasma polymer coating precursor are present within the plasma deposition apparatus. Said additive materials may be inert and act as buffers without any of their atomic structure being incorporated into the growing plasma polymer (suitable examples include the noble gases). A buffer of this type may be necessary to maintain a required process pressure. Alternatively the inert buffer may be required to sustain the plasma discharge. For example, the operation of atmospheric pressure glow discharge (APGD) plasmas often requires large quantities of helium. This helium diluent maintains the plasma by means of a Penning Ionisation mechanism without becoming incorporated within the deposited coating.

In other embodiments of the invention, the additive materials possess the capability to modify and/or be incorporated into the coating forming material and/or the resultant plasma deposited coating. Suitable examples include reactive gases such as halogens, oxygen, and ammonia.

In a particularly preferred embodiment of the invention the deposited plasma polymer possesses a transferable halogen group suited to participation in the technique known in the art as Atom Transfer Radical Polymerisation (ATRP). In this case, surface initiated polymerisation may proceed directly upon the plasma polymer coating after the addition of a copper-based catalyst (e.g. $Cu(I)(bpy)_2Br$) and the desired "grafting from" monomer.

In a specific example of this embodiment of the invention, the monomer for plasma polymerisation is 4-vinylbenzyl chloride. The resulting plasma deposited coating of poly(4-vinylbenzyl chloride) may then be used for the direct ATRP polymerisation of any monomers suited to this "grafting from" technique as are known in the art.

In an example of this "direct ATRP grafting" embodiment of the invention, the monomer utilised for plasma polymerisation is 2-bromoethylacrylate. The resulting plasma deposited coating of poly(2-bromoethylacrylate) may then be used for the direct ATRP polymerisation of any monomers suited to this "grafting from" technique as are known in the art.

In another specific example of the "direct ATRP grafting" aspect of the invention the monomer utilised for plasma polymerisation is allyl bromide. The resulting plasma deposited coating of poly(allyl bromide) may then be used for the direct ATRP polymerisation of any monomers suited to this "grafting from" technique as are known in the art.

In another particularly preferred embodiment of the invention the deposited plasma polymer possesses stable free-radical functionality suited to participation in free-radical based grafting techniques such as nitroxide mediated stable free-radical polymerisation, or dithioester based reversible addition fragmentation chain transfer (RAFT). In this case, surface initiated polymerisation may proceed directly upon the plasma polymer coating after the addition of a suitable mediating compound (e.g. tetramethylpiperidin-1-oxyl, TEMPO) and the desired "grafting from" monomer. In a specific example of this embodiment of the invention, the monomer for plasma polymerisation is maleic anhydride. The resulting plasma deposited coating of poly(maleic anhydride) may then, by virtue of its stable free radical functionality, be used for the direct nitroxide mediated or RAFT polymerisation of any monomers suited to these "grafting from" techniques as are known in the art.

However, if necessary derivatisation of a radical possessing plasma polymer film prior to graft polymerisation may be performed in order to yield benefits that include an enhanced rate of graft polymerisation. In an example of this further aspect of the invention, the plasma deposited coating of poly (maleic anhydride) is derivatised with an amine (such as allylamine or propylamine) before the commencement of graft polymerisation. Said amine derivatisation results in an enhanced rate of surface graft polymerization.

In one embodiment of the invention the plasma deposited coating requires further derivatisation before the application of the surface bound polymerisation technique (i.e. the "grafting from" stage).

In a particular embodiment of this aspect of the invention the intermediate derivatisation step is performed using sodium diethyldithiocarbamate. The resultant dithiocarbamate functionalised plasma polymer is subsequently used as a source of surface-bound initiator for the Iniferter photopolymerisation of quasi-living polymer brushes of whichever monomers suited to this "grafting from" technique are known in the art In another embodiment of this aspect of the invention, the intermediate derivatisation step attaches an azobisbatyronitrile type initiator. A specific example of this methodology is the pulsed-plasma deposition of poly(glycidyl methacrlyate) followed by derivatisation with 2,2' azobis(2-amidinopropane) hydrochloride to produce a surface capable of initiating surface free-radical graft polymerization.

In a further aspect of the invention there is provided a method for performing a surface initiated polymerization procedure, the method including the steps of applying a coating to a substrate by the deposition of a plasma polymerized coating material and then performing the polymerization procedure on the coating.

In the method of the invention, a surface initiated polymerisation procedure ("grafting from") is undertaken subsequent to the deposition of a plasma polymerised layer. In some embodiments of the invention, this step may be undertaken directly after plasma polymer deposition, upon the addition of suitable monomer(s) and suitable catalytic or mediating compound(s). In other embodiments of the invention the plasma deposited coating is further derivatised before the application of the surface bound polymerisation technique (i.e. the "grafting from" stage).

More than one monomer may be grafted upon the plasma polymer coated substrate during the surface-initiated polymerisation step. The monomers may be polymerised simultaneously, or in the case of "living"/"quasi living" polymerisation techniques (which include, but are not limited to, ATRP, nitroxide mediated, and Iniferter polymerisation) applied in turn to produce block copolymers, polymer "bottle-brushes" and other polymer architectures as are known in the art.

The method of the invention may result in a product wholly coated in surface-initiated ("grafted from") polymer coating.

In an alternative aspect of the invention the surface-initiated ("grafted from") polymer coating is only applied to selected surface domains.

The restriction of the "grafting from" polymer coating to specific surface domains may be achieved by limiting the initial plasma deposition step of the method to said specific surface domains. In one embodiment of this aspect of the invention, the aforementioned spatial restriction is achieved by depositing the plasma coating through a mask or template. The pattern produced by masking is subsequently transferred to the "grafted from" polymer coating. This produces a sample exhibiting regions covered with "grafted from" polymer juxtaposed with regions that exhibit no "grafted from" polymer.

An alternative means of restricting the "grafting from" polymer coating procedure to specific surface domains comprises: depositing the plasma polymer precursor over the entire surface of the sample, before rendering selected areas of it incapable of initiating the "grafting from" step. The spatially selective removal/damage of the plasma deposited precursor may be achieved using numerous means as are described in the art. Suitable methods include, but are not limited to, electron beam etching and exposure to ultraviolet irradiation through a mask. The pattern of non-transmitting material possessed by the mask is hence transferred to areas of "grafted from" polymer growth.

In a further embodiment of the invention the "grafting from" polymerization can proceed directly from the deposited plasma polymer layer. Suitable plasma polymers for use in this aspect possess functional groups capable of acting as initiator sites for at least one "grafting from" procedure. For example, plasma polymers that possess transferable halogen moieties may directly initiate Atom Transfer Radical Polymerization (ATRP) without further modification. In a further example, plasma polymers that, as a consequence of their structure and mode of deposition, possess stable radical functionalities (such as plasma polymerized maleic anhydride) may be used to directly initiate nitroxide-mediated living free-radical polymerization of a variety of monomers (nitroxide mediators include teramethypiperidin-1-oxyl, TEMPO).

In an alternative embodiment of the method, the plasma polymer layer requires further derivatisation before it can initiate polymer growth (i.e. the "grafting from" step).

In another embodiment of the method, the derivatisation of the plasma polymer layer before surface "grafting from" is not required to initiate polymer growth but is performed in order to realize benefits that include, but are not limited to, an enhanced rate of graft polymerization.

In a further aspect of the invention there is provided a substrate having a coating on at least one surface of a plasma polymerized coating material a surface initiated polymerization material formed on said coating.

In one embodiment the surface initiated polymerization material is formed using a grafted from procedure.

DETAILED DESCRIPTION OF THE DRAWINGS

Figure 8:
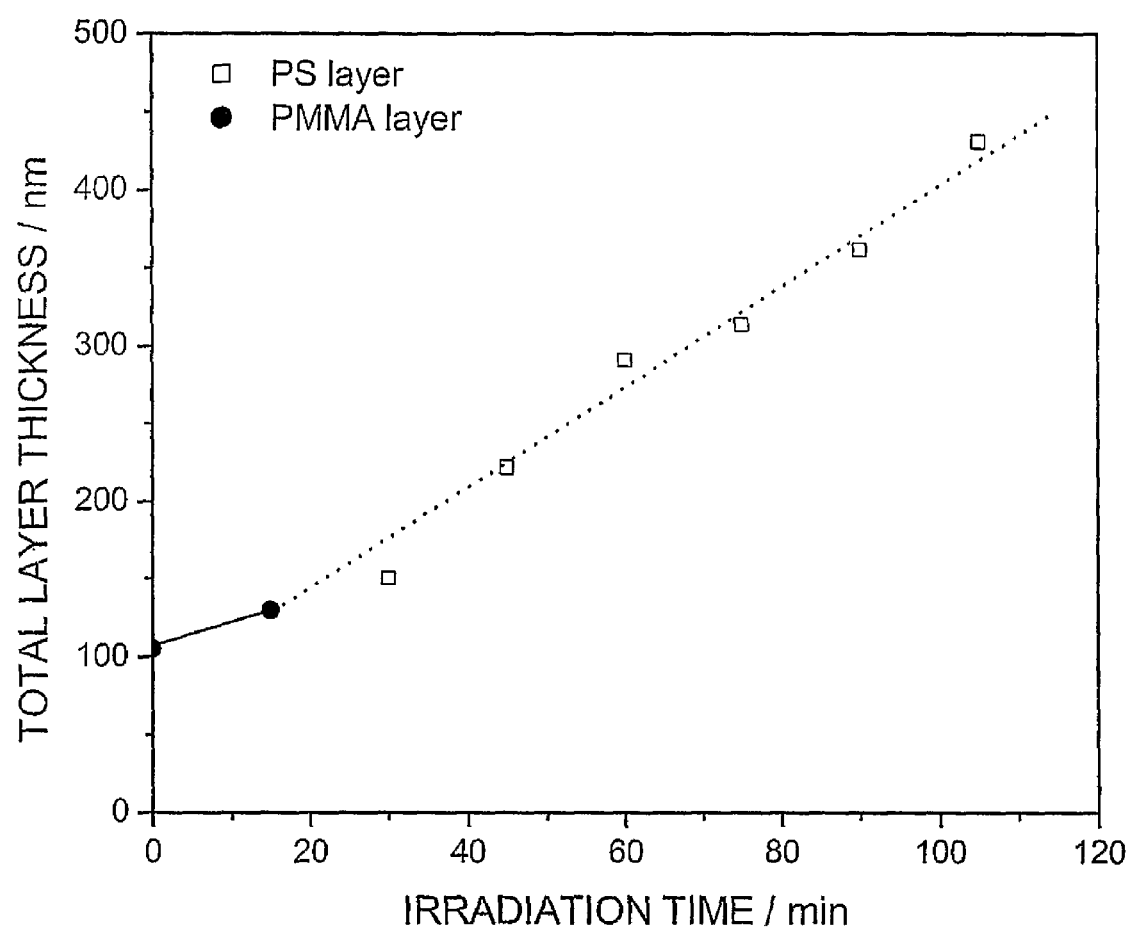

FIG. 8 is a graph showing the variation in layer thickness as a function of irradiation time during Iniferter photopolymerization. The starting 4-VBC pulsed plasma polymer layer thickness was 100 nm (i.e. at time=0 min), and the monomer was switched to styrene from methylmethacrylate after 15 minutes.

Figure 9:
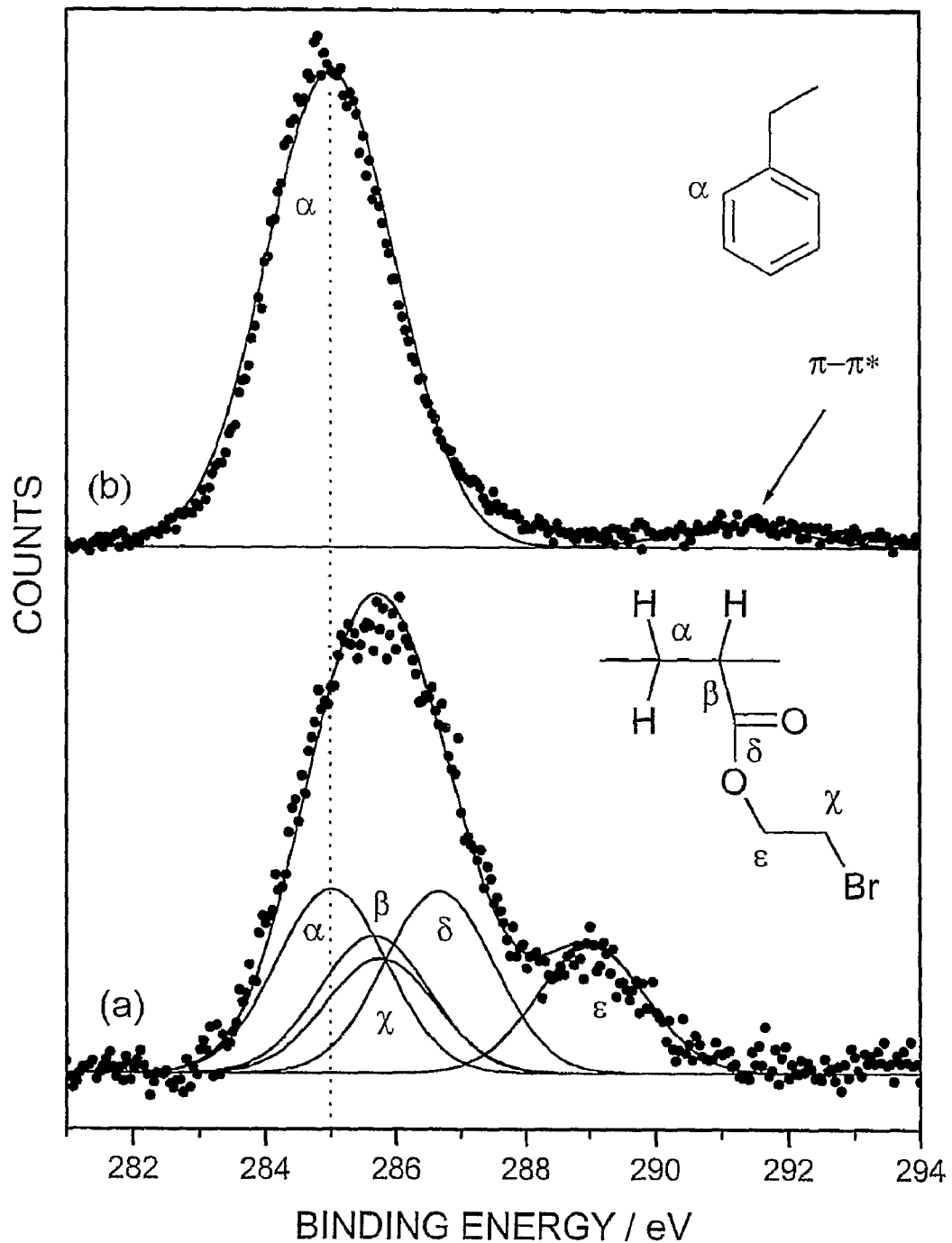

FIG. 9 shows the C(1s) XPS spectra of: (a) pulsed plasma polymerized 2-bromoethylacrylate (2-BEA), and (b) the grafted layer of Iniferter photopolymerized polystyrene (PS).

Figure 10:
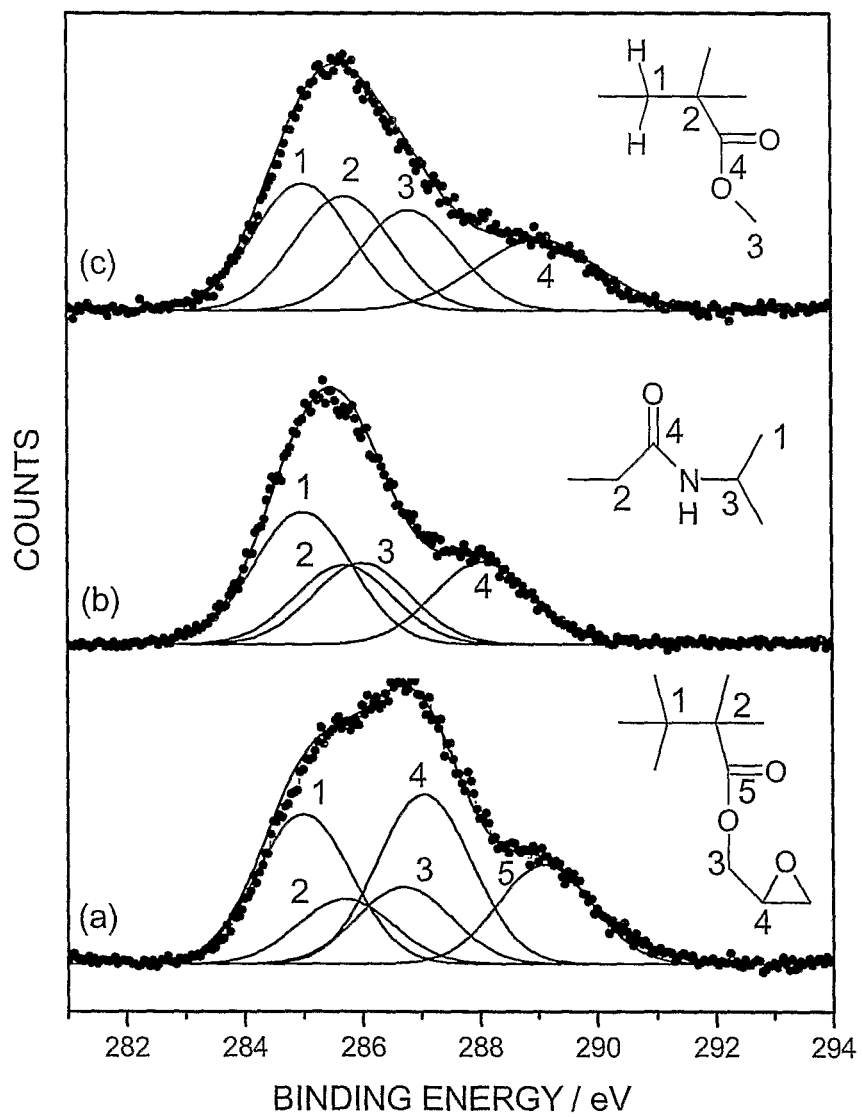

FIG. 10 shows the XPS C(1s) envelopes of (a) pulsed plasma polymerized glycidyl methacrylate (GMA), and (b) n-isopropylacrylamide graft polymerized onto GMA after derivatisation with an azo initiator, and (c) methylmethacrylate graft polymerized onto GMA after derivatisation with the azo initiator.

Figure 11A:
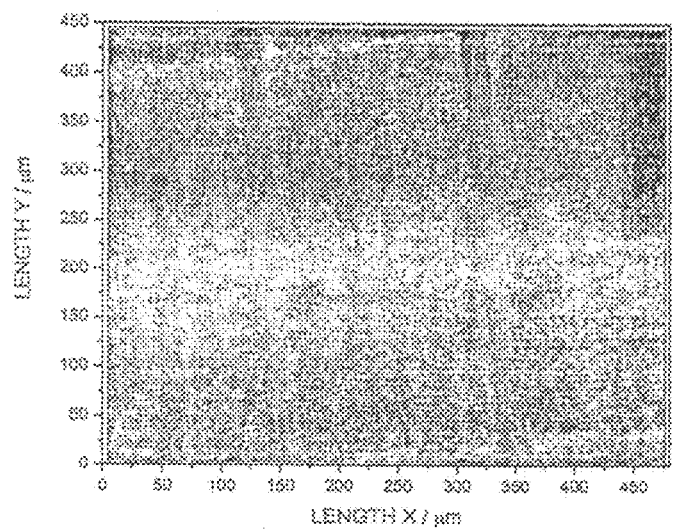

FIG. 11a is a fluorescence micrograph showing a surface-grafted n-isopropylacrylamide microarray labelled with a fluorescent protein (FITC-BSA) at 20° C.

Figure 11B:
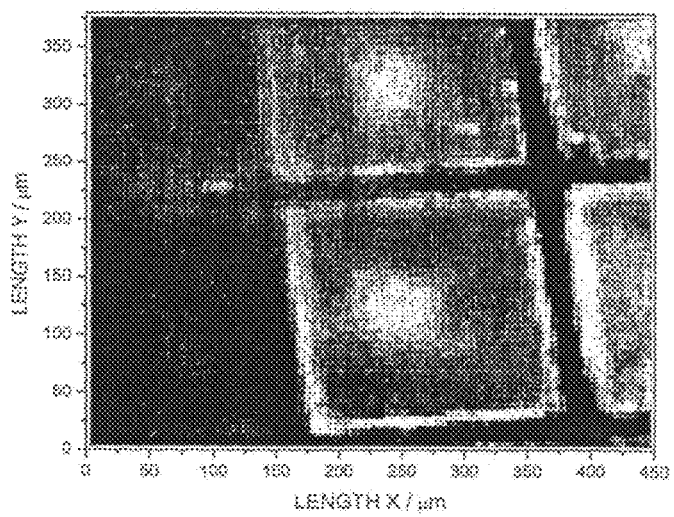

FIG. 11b is a fluorescence micrograph showing a surface-grafted n-isopropylacrylamide microarray labelled with a fluorescent protein (FITC-BSA), and heated to 40° C.

Figure 12:
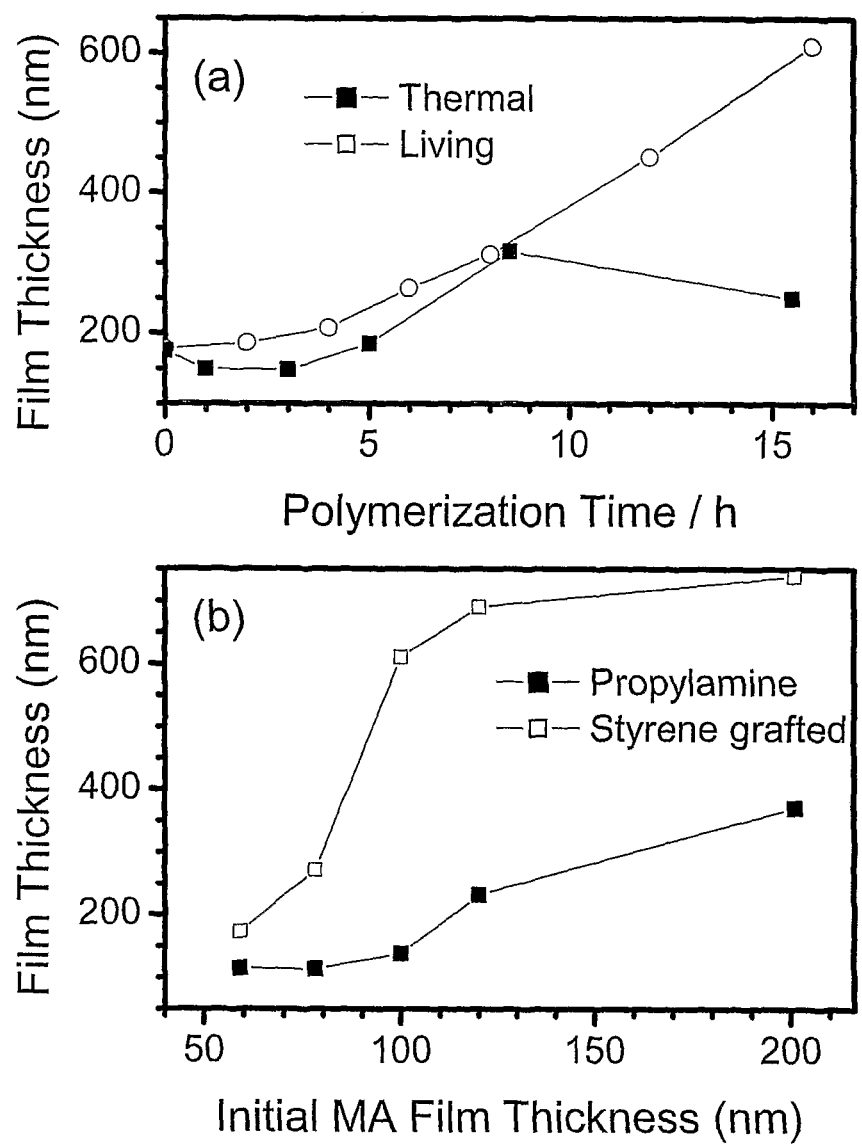

FIG. 12 shows changes in film thickness following TEMPO mediated graft polymerisation of styrene onto: (a) propylamine derivatized 100 nm thick pulsed plasma polymerised maleic anhydride (MA), thickness as a function of styrene graft duration; and (b) varying thicknesses of MA which have been derivatised with propylamine (amide). A similar trend was noted with allylamine.

DETAILED DESCRIPTION OF THE INVENTION

The following examples are intended to illustrate the present invention but are not intended to limit the same:

Example 1

Atom Transfer Radical Polymerization (ATRP) of poly(methylmethacrylate) from a pulsed-plasma polymer of 4-vinylbenzyl chloride 4-Vinylbenzyl chloride (+97% purity Aldrich) plasma polymer precursor was loaded into a resealable glass tube and purified using several freeze-pump-thaw cycles. Pulsed plasma polymerization of the halogen-containing monomer was carried out in a cylindrical glass reactor (4.5 cm diameter, 460 $cm^3$ volume, $2\times10^{-3}$ mbar base pressure, $1.4\times10^{-9}$ $mols^{-1}$ leak rate) surrounded by a copper coil (4 mm diameter, 10 turns, located 15 cm away from the precursor inlet) and enclosed in a Faraday cage. The chamber was evacuated using a 30 L $min^{-1}$ rotary pump attached to a liquid nitrogen cold trap and the pressure monitored with a Pirani gauge. All fittings were grease-free. During pulsed plasma deposition the radiofrequency power supply (13.56 MHz) was triggered by a square wave signal generator with the resultant pulse shape monitored using an oscilloscope. The output impedance of the RF power supply was matched to the partially ionized gas load using an L-C matching network.

Prior to use, the apparatus was thoroughly cleaned by scrubbing with detergent, rinsing in propan-2-ol, and oven drying. At this stage the reactor was reassembled and evacuated to base pressure. Further cleaning comprised running a continuous wave air plasma at 0.2 mbar and 40 W for 30 minutes. Next, a silicon wafer (10 mm×15 mm) was inserted into the center of the reactor and the system re-evacuated to base pressure. Monomer vapor was then introduced into the chamber at a pressure of 0.15 mbar for 5 min prior to plasma ignition.

Optimum halogen functional group retention at the surface was found to require 16 W continuous wave bursts lasting 20 μs ($t_{on}$), interspersed by off-periods ($t_{off}$) of 1200 μs. The average power delivered to the system during this pulsing regime was hence 0.26 W. After 15 minutes of deposition, the RF generator was switched off and the precursor allowed to purge through the system for a further 5 minutes. Finally, the chamber was re-evacuated to base pressure and vented to atmosphere.

Atom transfer radical polymerization (ATRP) onto the 4-vinylbenzyl chloride (4-VBC) pulsed plasma polymer coated silicon wafers comprised placing each substrate into a glass tube containing 0.01 M copper(I) bromide (+98% Aldrich), 0.02 M dipyridyl (+99%, Aldrich), 0.2 M methylmethacrylate (+99%, Aldrich), and 3 ml of dimethyl formamide (+99.9%, Aldrich). The reaction tube was then immersed into an oil bath and maintained at 90° C. for varying durations. Upon cooling, the wafers were removed and any physisorbed polymer dislodged by continuous extraction in tetrahydrofuran solvent for 16 hours at 65° C.

Unequivocal proof that the chlorine atoms present in the pulsed plasma polymerised 4-vinylbenzyl chloride (4-VBC) layer acted as the initiation centers for atom transfer radical polymerization (ATRP) was obtained by running a control experiment in which styrene was used instead of 4-VBC as the precursor for pulsed plasma polymerization. No ATRP polymer was observed.

The ATRP grafted poly(methylmethacrylate) layers were characterized by X-ray Photoelectron spectroscopy (XPS). Film thickness measurements entailed cryogenic microtome cross-sectioning of the coated substrate (Leica model RM 2165), the metallization of a 10 nm gold layer onto the surface, and then scanning electron microscopy (SEM) analysis (Cambridge Instruments model S240).

Figure 1:
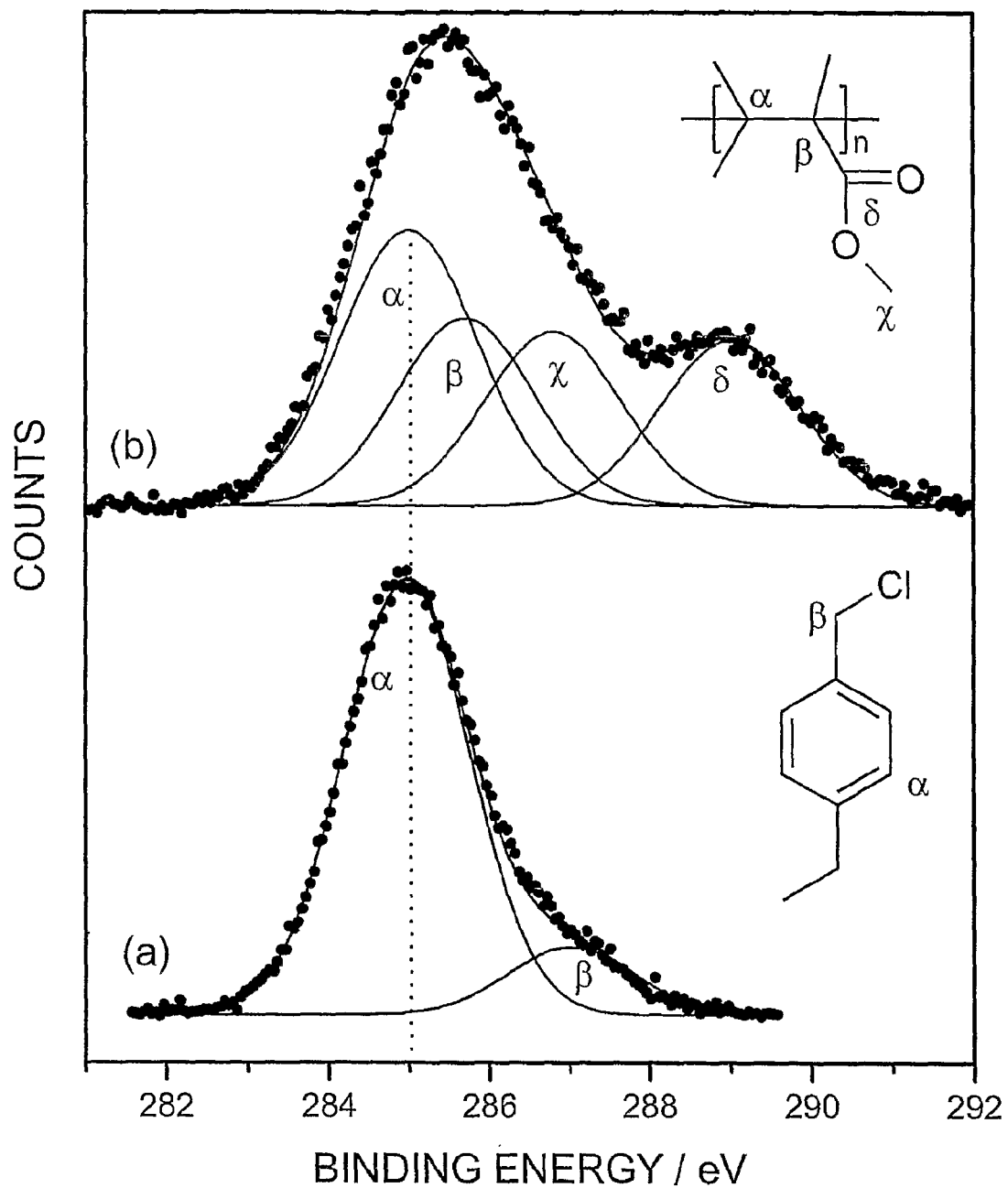
FIG. 1 shows the C(1s) XPS spectra of (a) pulsed plasma polymerised 4-vinylbenzyl chloride (4-VBC); and (b) poly (methylmethacrylate) grafted by ATRP onto a 4-VBC layer.

XPS characterization of the pulsed plasma polymerized 4-VBC films showed that the film stoichiometry was in close agreement with the predicted theoretical values for complete functional group retention, Table 1. The absence of a Si(2p) signal from the silicon substrate confirmed complete coverage by the plasma polymer film. The corresponding high resolution C(1s) XPS spectrum of the 4-VBC layer, indicated the presence of two types of carbon environment: carbon bonded to carbon or hydrogen (~285.0 eV), and carbon bonded to a chlorine atom (287.05 eV), FIG. 1. There was also a π-π* shake-up satellite associated with the phenyl ring. The C(1s) spectrum of the ATRP grafted poly(methylmethacrylate) layer was consistent with the four different carbon environments found in PMMA: carbon singly bonded to hydrogen (~285.0 eV), carbon adjacent to a carbonyl group (~285.7 eV), carbon singly bonded to oxygen (~286.6 eV), and the ester carbon (~289.1 eV), FIG. 1. XPS elemental analysis provided additional evidence for the ATRP growth of poly (methylmethacrylate) on the surface, Table 1.

TABLE 1

XPS stoichiometries of pulsed plasma polymerized 4-VBC before and after ATRP grafting of poly(methylmethacrylate) (PMMA):

| Surface | | % C | % O | % Cl | % Si |
|---|---|---|---|---|---|
| 4-VBC | Theoretical | 90 | 0 | 10 | 0 |
| | Measured | 89 ± 1 | 0 | 11 ± 1 | 0 |
| ATRP grafted PMMA on 4-VBC | Theoretical | 72 | 28 | 0 | 0 |
| | Measured | 75 ± 2 | 25 ± 2 | <0.1 | 0 |

Figure 2:
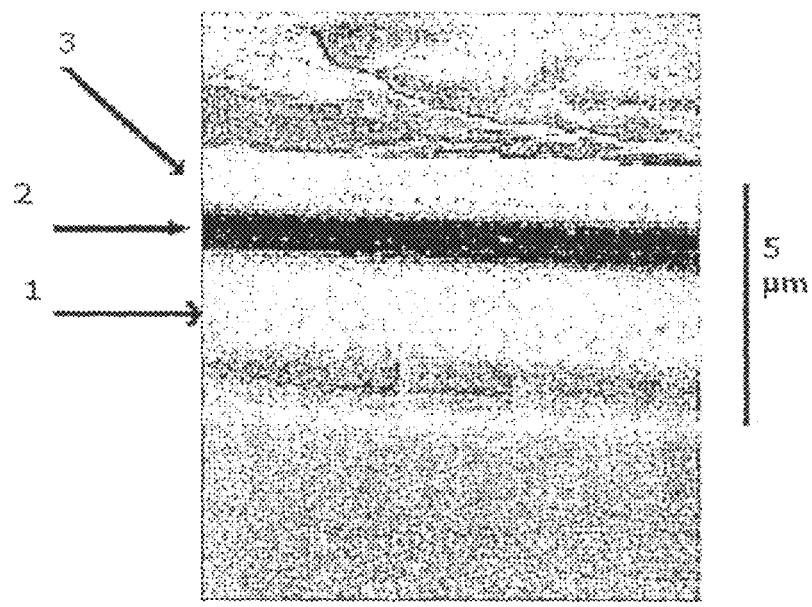
FIG. 2 is an SEM micrograph cross-section showing a silicon wafer (1) coated with a 700 nm thickness of pulsed plasma polymerised 4-VBC (2), and further coated with a 2.0 μm thick layer of ATRP grafted poly(methylmethacrylate) (3).

The cross-sectional analysis by Scanning Electron Microscopy (SEM) of ATRP grafted plyo(methylmethacrylate) on plasma polymerized 4-VBC clearly showed the respective layers, FIG. 2.

Figure 3:
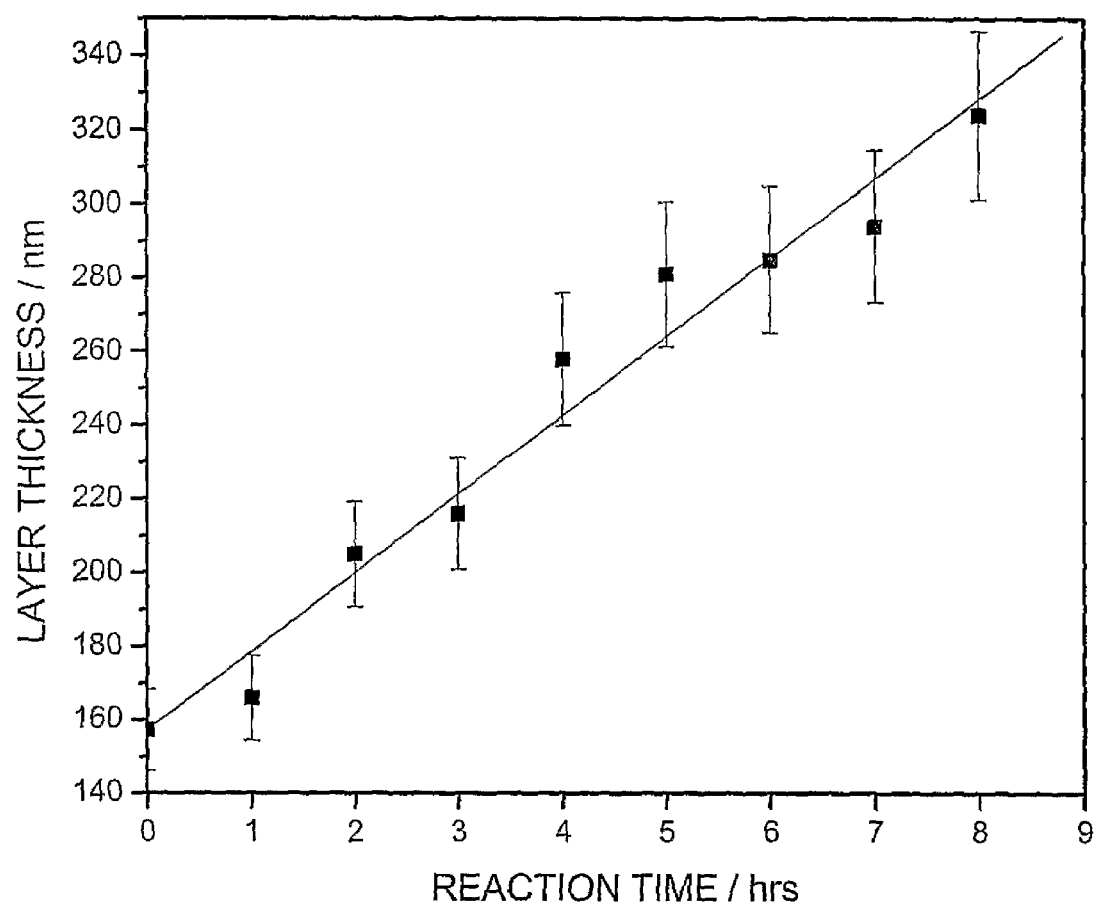
FIG. 3 is a graph that shows the linear relationship between the thickness of an ATRP grafted poly(methylmethacrylate) coating and the ATRP reaction duration. The grafted layers were grown from a 150 nm thick pulsed plasma polymerised layer of 4-VBC.

The living nature of these surfaces was exemplified by varying the ATRP polymerization time (1-8 hours) whilst measuring the polymer layer thickness using reflectometry. A lower concentration of methylmethacrylate (0.1 M) was added to the reaction mixture in order to yield thinner films whose thickness could be more accurately determined by the reflectometry technique. The grafted poly(methylmethacrylate) layer thickness (and hence its molecular weight) was found to increase linearly in proportion to reaction duration, FIG. 3, thereby proving that the ATRP process is living, and that no significant termination reactions had occurred.

Figure 4A:
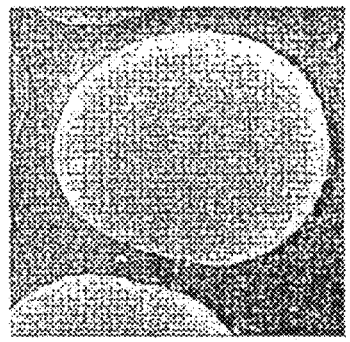
FIG. 4a shows the SEM cross-section of an uncoated 80 μm polystyrene microsphere.
Figure 4B:
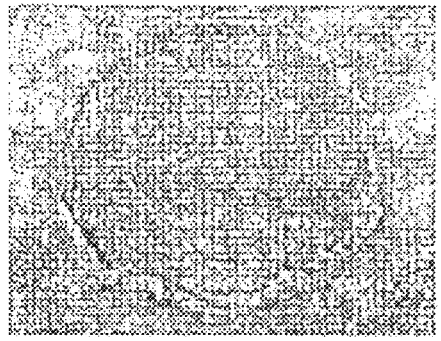
FIG. 4b shows the SEM cross-section of a polystyrene microsphere consecutively coated with a 200 nm thick pulsed plasma polymer of 4-VBC and a 1.2 μm thick ATRP grafted layer of poly(methylmethacrylate). Note that the size of the cross-section depends upon the depth at which the polymer bed has been sliced.

The universal applicability of this plasma polymerization methodology was demonstrated by coating polystyrene beads (80 μm diameter, Biosearch Technologies One) with pulsed plasma polymerized 4-vinylbenzyl chloride layer and subsequently ATRP grafting a poly(methyl methacrylate) layer. The resultant polymer-brush functionalized microspheres were then sprinkled on top of a thin layer of molten thermoplastic adhesive (Tempfix, Agar Scientific) which had been spread onto an aluminium plate (1×1 cm). Cooling to room temperature immobilized these beads into the adhesive surface. Thin slices were taken off the top of the exposed polymer microspheres by mounting this plate onto a cryogenic microtone to reveal cross-sections. Throughout this cutting procedure, the temperature of the substrate holder and knife was kept below −20° C. whilst the surrounding chamber temperature was maintained at −90° C. The poly(methyl methacrylate) layer thickness enveloping the beads was measured by scanning electron microscopy, FIG. 4.

Example 2

Atom Transfer Radical Polymerization (ATRP) of a Polystyrene-poly(glycidyl methacrylate) Block Copolymer from a Pulsed-plasma Polymer of 4-vinylbenzyl Chloride A pulsed plasma polymer of 4-vinylbenzyl chloride (4-VBC) was used as a substrate for the growth of a polystyrene-poly(glycidyl methacrylate) block copolymer by ATRP. Plasma deposition of 4-VBC and the subsequent ATRP of styrene (0.1 M) were performed as described in Example 1 (styrene ATRP duration: 2 hours). The resultant grafted polystyrene films were then washed and subject to further ATRP of glycidylmethacrylate (0.1 M) for varying durations (1-6 hours) using the same reaction protocol outlined previously with the addition of copper (II) bromide (0.005 M, 99%, Aldrich). Film thicknesses were determined by reflectometry.

Figure 5:
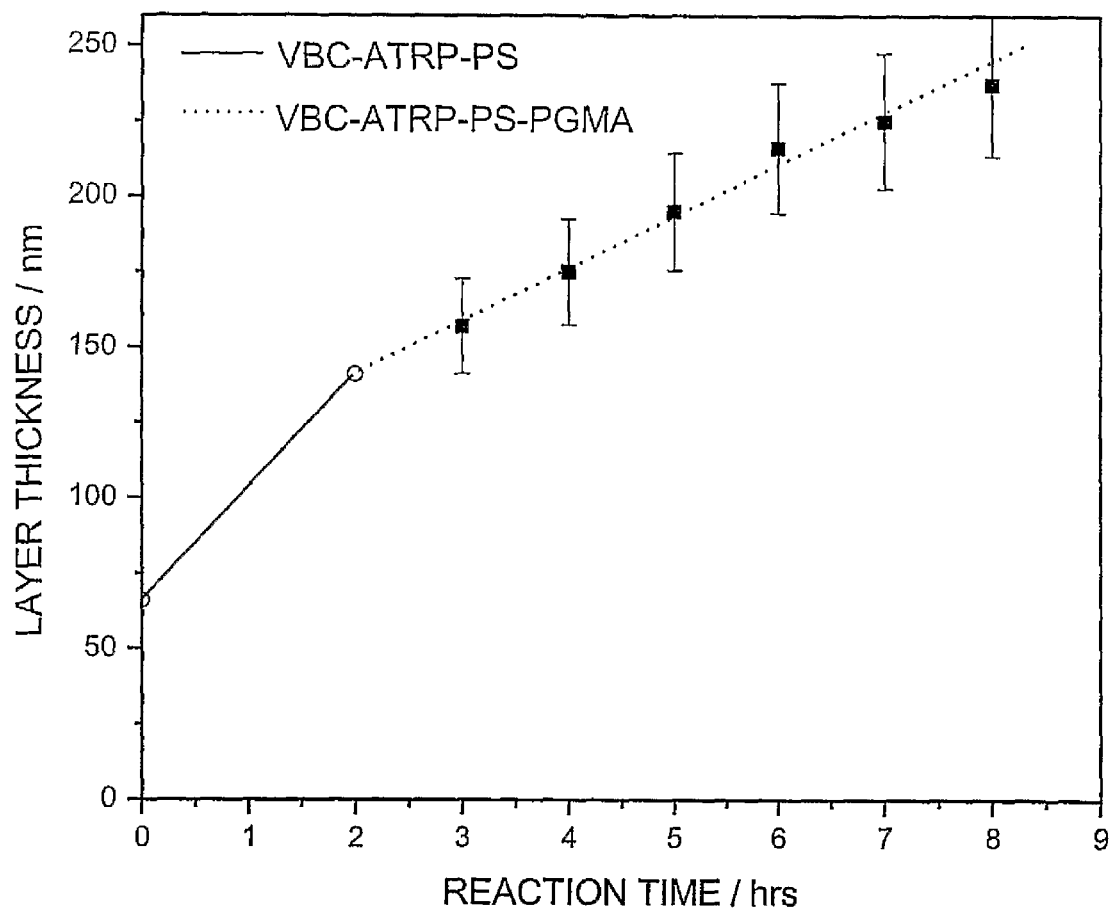
FIG. 5 is a graph showing the variation in layer thickness with ATRP reaction time of an ATRP grafted poly(glycidyl methacrylate)-polystyrene block copolymer grown from a 150 nm thick film of pulsed plasma polymerized 4-VBC.

The addition of copper (II) bromide to the polymerization mixture prior to reaction re-commencement helped to ensure a sufficient retention of end group functionality to initiate the second block of the copolymer. It was also found to yield controlled linear growth with respect to reaction time, FIG. 5. The excess of deactivating groups resulted in substantial suppression of chain termination and transfer, allowing the poly (glycidyl methacrylate) polymer chains to grow at the same rate, yielding a high degree of control of molecular weight.

Example 3

Atom Transfer Radical Polymerization (ATRP) of a Poly(glycidylmethacrylate) Micro-array onto a Regio-selectively Patterned Pulsed-plasma Polymer of 4-vinylbenzyl Chloride Micropatterned arrays of poly(glycidylmethacrylate), a reactive polymer amenable to further derivatization, were produced by ATRP. The procedure first comprised embossing a nickel grid (Agar, 2-000 mesh nickel corresponding to 7.5 μm square holes separated by 5 μm) into polytetrafluoroethylene (PTFE) slides (1.5 cm×1.0 cm). The exposed PTFE pixels were then activated by exposure to a 50 W argon plasma pretreatment for 20 min followed by pulsed plasma polymerisation of 4-vinylbenzyl chloride (4-VBC) as described in Example 1. The embossed grid was then lifted from the surface to leave behind well defined pixels of the ATRP initiating 4-VBC film. ATRP polymerization entailed immersion of the microarray into a glass tube containing the same catalyst solution employed in Example 1 (except that 0.2 M glycidylmethacrylate was substituted for methylmethacrylate). Dissolved gases were removed by several freeze-pump-thaw cycles and graft polymerization was carried out at 90° C.

Next, the PTFE slides were removed, rinsed in dimethyl formamide, and the poly(glycidylmethacrylate) microarrays fluorescently tagged by the reaction of their epoxide groups with a cresyl violet perchlorate solution ($5 \times 10^{-6}$ by weight in de-ionized water) for 1 hour at room temperature, followed by washing in de-ionized water. A fluorescence microscope system (LABRAM, Tobin Yvon Ltd) was then used to map the functionalized ATRP microarrays under 590 nm wavelength excitation.

Figure 6:
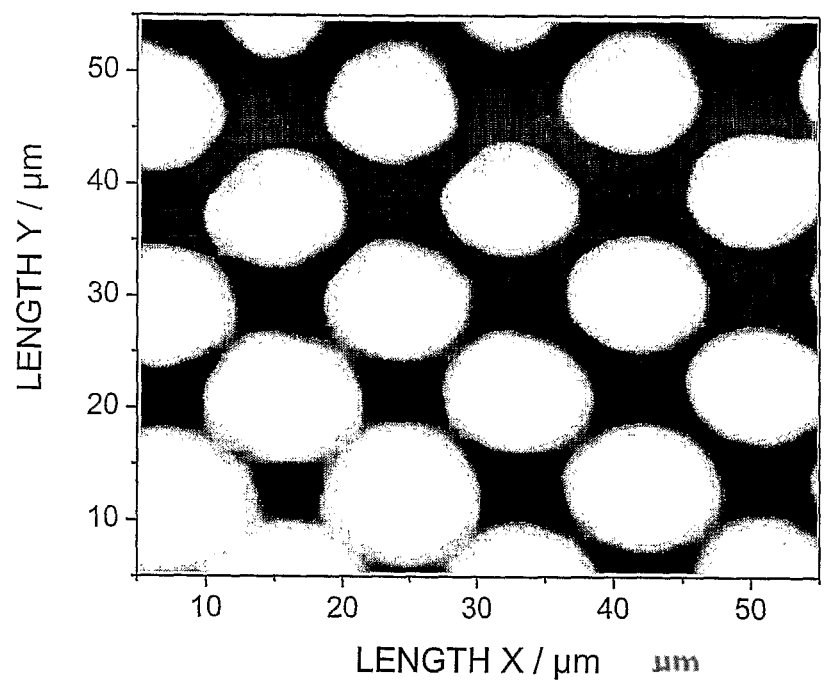
FIG. 6 is a fluorescence micrograph showing 7.5 μm pixels of ATRP grafted poly(glycidyl methacrylate) grown on a layer of pulsed plasma polymerised 4-vinylbenzyl chloride, and subsequently tagged using a fluorescent cresyl violet perchlorate dye.

The resulting fluorescence micrograph, FIG. 6, clearly shows the regio-selective capabilities of this plasma polymerisation based methodology. Note that despite employing a square grid mesh, the pixels are circular. This is indicative of the polymer brushes flopping over. Clearly the pendant epoxide groups contained in the areas occupied by the poly (glycidylmethacrylate) brushes are suitable for a host of further different derivatization chemistries as are known in the art.

Example 4

Iniferter Polymerisation of Polystyrene from a Derivatised Pulsed-plasma Polymer of 4-vinylbenzyl Chloride Samples coated with a pulsed plasma polymer of 4-vinylbenzyl chloride (4-VBC) were prepared using the procedure described in Example 1. Subsequent derivatisation, to produce surfaces possessing suitable initiator functionality for photochemical Iniferter polymerization, entailed placing the 4-VBC plasma polymer coated silicon substrates into a glass tube containing a 22 mM solution of sodium diethyldithiocarbamate (+99%, Aldrich), in ethanol, at room temperature, for a period of 24 hours. The dithiocarbamate functionalised 4-VBC coated wafers (4-VBC-DC) were then removed and rinsed in ethanol.

Iniferter polymerization then comprised, first placing the 4-VBC-DC samples in a glass tube (UV transmission cut-off ~220 nm) with a 0.5 M methanolic solution of styrene monomer (+99%, Aldrich). This was then evacuated and further purified by several freeze-pump-thaw cycles prior to UV irradiation with a HgXe lamp (200-700 nm excitation, Oriel Instruments). The photochemically grafted polymer brush films were then rinsed in methanol.

Figure 7:
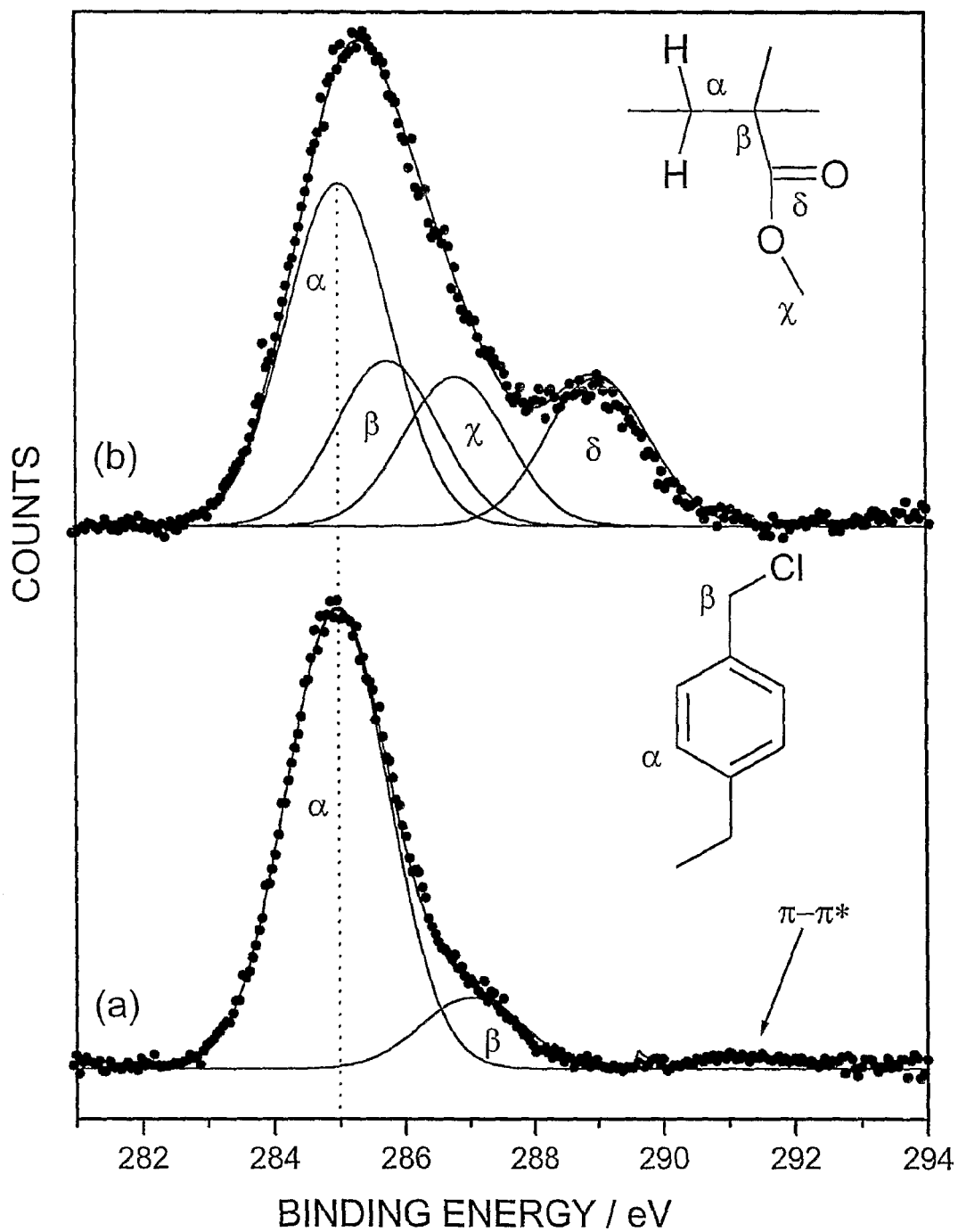
FIG. 7 shows the C(1s) XPS spectra of: (a) pulsed plasma polymerized 4-vinylbenzyl chloride; and (b) a grafted layer of Iniferter photopolymerized poly(methyl methacrylate).

The coating system was characterized by XPS, FTIR and scanning electron microscopy after each step in the procedure. Surface elemental analysis following the reaction of sodium diethyldithiocarbamate (SD) with the 4-vinylbenzyl chloride (4-VBC) pulsed plasma polymer layer indicated that a significant proportion of the chlorine groups at the surface of the pulsed plasma 4-VBC layer had reacted with the sodium diethyldithiocarbamate to yield Iniferter initiating groups (approximately 50% of those present within the ~2 nm XPS penetration depth of the surface), Table 2. The C(1s) spectrum of the poly(methyl methacrylate) layer (PMMA) grown by Iniferter grafting from this 4-VBC-DC surface could be fitted to four different carbon environments: carbon singly bonded to hydrogen (285.0 eV), carbon adjacent to the ester carbon, (285.7 eV), carbon singly bonded to oxygen (286.5 eV), and the ester carbon (289.1 eV); FIG. 7. Stoichiometric analysis indicated good agreement between the predicted and measured elemental percentages, Table 2. Only trace quantities of sulphur and nitrogen from the Iniferter initiating groups (located at the PMMA chain ends) could be detected.

TABLE 2

XPS elemental abundances of pulsed plasma polymerized 4-VBC; 4-VBC after derivatisation with dithiocarbamate to yield 4-VBC-DC; and after Iniferter graft photo-plymerization of polymethylmethacrylate (PMMA).

| Surface | | % C | % O | % S | % N | % Cl | % Br |
|---|---|---|---|---|---|---|---|
| 4-VBC | Theoretical | 90 | 0 | — | — | 10 | — |
| | Experimental | 89 ± 1 | <0.1 | — | — | 11 ± 1 | — |
| 4-VBC-DC | Theoretical | 82 | 0 | 12 | 6 | 0 | — |
| | Experimental | 87 ± 3 | <0.1 | 7 ± 2 | 3 ± 1 | 3 ± 1 | — |
| Iniferter PMMA on 4-VBC-DC | Theoretical | 72 | 28 | 0 | 0 | 0 | — |
| | Experimental | 74 ± 2 | 26 ± 2 | <0.1 | <0.1 | <0.1 | — |

Fourier transform infrared (FTIR) spectra of the pulsed plasma polymerised 4-VBC layer displayed the loss of the vinyl carbon-carbon double bond stretch at 1630 cm$^{-1}$, Table 3. Whilst the para-substituted benzene ring stretches at 1603 cm$^{-1}$ and 1495 cm$^{-1}$ remained intact. These observations are indicative of conventional polymerization occurring during the pulsed plasma duty cycle off-period. Reaction of sodium diethyldithiocarbamate with the 4-VBC pulsed plasma polymer film, to yield the 4-VBC-DC initiator surface, produced two new peaks at 1270 cm$^{-1}$ and 1205 cm$^{-1}$ that corresponded to the C=S and C—N stretches in S=C—N of dithiocarbamate respectively. Iniferter photopolymerization of methylmethacrylate gave rise to a C=O ester stretch at 1730 cm$^{-1}$ thereby confirming the formation of poly(methylmethacrylate) on the plasma polymer surface.

TABLE 3

The occurrence of FTIR peaks within films of: 4-VBC; 4-VBC after derivatisation with dithiocarbamate to yield 4-VBC-DC; and after Iniferter graft photo-polymerization of polymethylmethacrylate (PMMA):

| Assignment | 4-VBC monomer | 4-VBC plasma polymer | 4-VBC-DC | 4-VBC-DC-PMMA |
|---|---|---|---|---|
| C=O ester stretch, 1730 cm$^{-1}$ | | | | * |
| Para-substituted aromatic ring stretch 1603 cm$^{-1}$ | * | * | * | * |
| Para-substituted aromatic ring stretch 1495 cm$^{-1}$ | * | * | * | * |
| C=S stretch, 1205 cm$^{-1}$ | | | * | |
| C=C stretch 1630 cm$^{-1}$ | * | | | |
| CH$_2$ symmetric stretch 1452 cm$^{-1}$ | * | * | * | * |
| C—N stretch (in S=C—N) 1270 cm$^{-1}$ | | | * | |

Example 5

Iniferter Polymerization of Poly(Methylmethacrylate)-Poly(Styrene) Block Polymer Brushes from a Derivatised Pulsed-Plasma Polymer of 4-Vinylbenzyl Chloride The quasi-living nature of surfaces prepared by Iniferter photo-polymerisation from plasma deposited films was exemplified by growing block-copolymer brushes. Poly(methylmethacrylate)-poly(styrene) block polymer brushes were produced by first irradiating 4-VBC-DC films (prepared using the procedure described in Example 4) for 15 minutes in a 0.1 M methanolic solution of methylmethacrylate, followed by washing in methanol, and further UV irradiated in a 0.1 M methanolic solution of styrene. The film thickness was measured at regular time intervals by reflectometry.

The growth of the second polymer layer (Iniferter grafted polystyrene) was found to be linear with respect to irradiation time, FIG. 8, thereby proving that the original layer of grafted poly(methyl methacrylate) chains was still active towards surface initiated polymerisation following the monomer switch-over.

Example 6

Iniferter Polymerization of Methyl Methacrylate from a Derivatised Pulsed Plasma Polymer Layer of 2-bromoethylacrylate Silicon wafer samples coated with a 2-bromoethylacrylate (+99% ABCR) plasma polymer (2-BEA) and further derivatised with sodium diethyldithiocarbamate were prepared using the apparatus and plasma deposition methodology described in Example 4 (except that 2-bromoethylacrylate was substituted for 4-VBC). Iniferter attachment of poly(methyl methacrylate) to these "2-BEA-DC" samples was then performed with a 0.5 M methanolic solution of methyl methacrylate monomer using the same photo-polymerization procedure described in Example 4. The grafted polymer brush films were then rinsed in methanol. Film characterization was performed at each stage in the procedure by XPS, FTIR and scanning electron microscopy.

The high resolution C(1s) XPS spectrum of the 2-bromoethylacrylate (2-BEA) pulsed plasma polymer layer could be fitted to five carbon environments: carbon singly bonded to hydrogen (~285.0 eV), carbon adjoining an ester carbon (~285.7 eV), carbon bonded to a bromine atom (~285.8 eV), carbon singly bonded to oxygen (~286.5 eV) and the ester carbon (~289.1 eV), FIG. 9. The film stoichiometry was in good agreement with the predicted theoretical values, Table 4. The absence of any Si(2p) signal indicated complete coverage of the silicon wafer by the plasma polymer.

TABLE 4

XPS elemental abundances of pulsed plasma polymerized 2-BEA; 2-BEA after derivatisation with dithiocarbamate to yield 2-BEA-DC; and after Iniferter graft photo-polymerization of polystyrene (PS).

| Surface | | % C | % O | % S | % N | % Cl | % Br |
|---|---|---|---|---|---|---|---|
| 2-BEA | Theoretical | 63 | 25 | — | — | — | 12 |
| | Experimental | 66 ± 2 | 24 ± 2 | — | — | — | 10 ± 1 |
| 2-BEA-DC | Theoretical | 67 | 13 | 13 | 7 | — | 0 |
| | Experimental | 65 ± 3 | 15 ± 1.5 | 12 ± 1.5 | 5 | — | 3 ± 1 |
| Iniferter | Theoretical | 100 | 0 | 0 | 0 | — | 0 |
| PS on 2-BEA-DC | Experimental | 100 | <0.1 | <0.1 | <0.1 | — | <0.1 |

Stoichiometric analysis following the reaction with sodium diethyldithiocarbamate showed that approximately 62% of the bromine atoms had reacted within the ~2 nm XPS sampling depth to produce a 2-bromoethylacrylate pulsed plasma polymer functionalised with diethyldithiocarbamate Iniferter groups (2-BEA-DC). The C(1s) spectrum following Iniferter polymerization of polystyrene (PS) displayed a prominent hydrocarbon environment (285.0 eV) and its associated $\pi$-$\pi$* shake-up satellite, FIG. 9. Compositional analysis indicated only trace amounts of sulphur and nitrogen remained (belonging to dithiocarbamate groups located at the polystyrene chain ends), Table 4.

The infrared spectrum of the 2-bromoethylacrylate monomer contained a characteristic carbonyl stretch at 1730 cm$^{-1}$ and a C=C double bond stretch at 1630 cm$^{-1}$, Table 5. The carbonyl stretch was still evident following pulsed plasma polymerization of 2-bromoethylacrylate whilst the alkene stretch had disappeared, thereby confirming structural retention of monomer functionality. Reaction with sodium diethyldithiocarbamate to produce 2-BEA-DC yielded two signature peaks at 1270 cm$^{-1}$ and 1205 cm$^{-1}$, corresponding to the dithiocarbamate C=S and C—N (in S=C—N) stretches respectively. Iniferter photopolymerization of styrene gave rise to the emergence of aromatic ring stretches at 1603 cm$^{-1}$ and 1495 cm$^{-1}$ attributable to the growth of grafted polymer chains.

TABLE 5

The occurrence of FTIR peaks within films of: 2-BEA; 2-BEA after derivatisation with dithiocarbamate to yield 2-BEA-DC; and after Iniferter graft photo-polymerization of polystyrene (PS):

| Assignment | 2-BEA monomer | 2-BEA plasma polymer | BEA-DC | BEA-DC-PS |
|---|---|---|---|---|
| C=O ester stretch, 1730 cm$^{-1}$ | * | * | * | * |
| Para-substituted aromatic ring stretch 1603 cm$^{-1}$ | | | | * |
| Para-substituted aromatic ring stretch 1495 cm$^{-1}$ | | | | * |
| C=S stretch, 1205 cm$^{-1}$ | | | * | |
| C=C stretch, 1630 cm$^{-1}$ | * | | | |
| CH$_2$ symmetric stretch 1452 cm$^{-1}$ | * | * | * | * |
| C—N stretch (in S=C—N) 1270 cm$^{-1}$ | | | | * |

Example 7

Surface-Initiated Free-Radical Polymerisation of n-Isopropylacrylamide (98% Aldrich) Arrays and Poly(Methylmethacrylate) Films from 2,2'-Azobis(2-Amidinopropane) Hydrochloride Derivatised Pulsed Plasma Polymer Layers of Glycidylmethacrylate Glycidylmethacrylate (97% purity, Aldrich) was plasma polymerized using the same apparatus and general method as described in Example 1. Optimum film deposition conditions were found to correspond to 20 W continuous wave bursts lasting 20 μs ($t_{on}$), interspersed by off-periods ($t_{off}$) of 20,000 μs.

The surface elemental composition (analysed by XPS) of pulsed plasma deposited poly(glycidyl methacrylate) films (GMA) was found to be in good agreement with the theoretical values for the precursor, Table 6. This was supported by analysis of the corresponding XPS C(1s) envelope which could be fitted to five different carbon environments: carbon bonded to hydrogen ($C_xH_y$=285.0 eV), carbon adjoining a carbonyl group (C—C=O=285.7 eV), carbon bonded to oxygen (C—O=285.5 eV), epoxide carbon (=287.2 eV), and carbonyl group (C=O=289.2 eV), FIG. 10. The absence of a Si(2p) signals confirmed that the films possessed a thickness greater than 2-5 nm.

Surface immobilization of the free radical initiator comprised immersing the pulsed plasma poly(glycidylmethacrylate) coated substrates for 16 hours in a 0.1 M aqueous solution of 2,2'-azobis(2-amidinopropane) hydrochloride (99%, Aldrich), 3.0 M sodium chloride (99.9%, Sigma), and 0.5 M sodium citrate dehydrate (99%, Aldrich), followed by washing in deionized water and drying in a stream of nitrogen.

Surface elemental analysis following the reaction of the plasma polymerised GMA film with 2,2'-azobis(2-amidinopropane) hydrochloride showed that approximately 50% of the epoxide groups had undergone reaction within the 2-5 nm XPS sampling depth to produce an initiator functionalised surface (GMA-VAzo), Table 6.

Surface initiated free-radical polymerization comprised placing the amine terminated dialkyldiazene initiator functionalized surfaces (GMA-VAzo) into a 1.0 M aqueous solution of either methyl methacrylate or n-isopropylacrylamide (NIPAM, 98%, Aldrich), followed by outgassing using several freeze-pump-thaw cycles to remove oxygen, before heating at 65° C. for 16 hours in a silicone oil bath. The surface grafted films were then removed and repeatedly washed in deionized water.

TABLE 6

XPS elemental abundances of pulsed plasma polymerized GMA; GMA after derivatisation with 2,2'-azobis(2-amidinopropane) hydrochloride to yield GMA-VAzo; and after surface free-radical graft polymerization of n-isopropyl-acrylamide (NIPAM), and polymethylmethacrylate (PMMA):

| Surface | | % C | % O | % N |
|---|---|---|---|---|
| GMA plasma polymer | Theoretical | 70 | 30 | — |
| | Experimental | 70 ± 1 | 30 ± 1 | — |
| GMA-VAzo | Theoretical (assuming 100% reaction of VAzo) | 62.5 | 12.5 | 25 |
| | Experimental | 63 ± 3 | 25 ± 2 | 12 ± 2 |
| NIPAM grafted onto GMA-VAzo | Theoretical | 75 | 12.5 | 12.5 |
| | Experimental | 74 ± 1 | 13 ± 1 | 13 ± 1 |
| PMMA grafted onto GMA-VAzo | Theoretical | 72 | 28 | Trace |
| | Experimental | 73 ± 2 | 27 ± 2 | <0.1 |

XPS surface elemental abundance measurements of the grafted poly(methylmethacrylate) layers were substantially identical to the predicted values, Table 6. The absence of any nitrogen signal indicated a homogeneous film of grafted poly(methylmethacrylate) polymer chains. This was corroborated by the shape of the C(1s) envelope which could be fitted to the four carbon environments characteristic of poly(methylmethacrylate): carbon bonded to hydrogen ($C_xH_y$=285.0 eV), carbon adjacent to a carbonyl group (C—C=O=285.7 eV), carbon bonded to oxygen (C—O=286.5 eV), and carbonyl carbon (N—C=O=289.2 eV), FIG. 10.

The XPS derived surface elemental abundances of the surface grafted poly(n-isoacrylamide) films (NIPAM) were also found to be in good agreement with the theoretical values, Table 6. The C(1s) envelope could be fitted to four carbon environments: carbon bonded to hydrogen ($C_xH_y$=285.0 eV), carbon adjacent to a carbonyl group (C—C=O=285.7 eV), carbon bonded to nitrogen (C—N=286.0 eV) and carbonyl carbon (C=O=288.1 eV), FIG. 10.

No grafting of either monomer was observed if the 2,2'-azobis(2-amidinopropane) hydrochloride initiator immobilization step was omitted.

Poly(n-isopropylacrylamide) (NIPAM) is a thermally responsive polymer that can display reversible protein-resistance behaviour. This type of functionality is of utility in applications such as proteomics and cell growth that require regio-selectivity. To this end, arrays of free-radical graft polymerized NIPAM were formed by first performing the GMA plasma deposition step through a nickel grid (200 mesh, 200 µm holes separated by 20 µm) which had been embossed into a piece of polytetrafluoroethylene (PTFE) in a procedure similar to that described in Example 3. The resultant arrays were then tested for thermal response and protein adsorption by immersion in a solution of fluoroscein isothiocyanate-labelled bovine serum albumin (FITC-BSA) (Fluka), 0.5 mg/ml in HBS-EP buffer at temperatures of 20° C. and 40° C. The films were subsequently rinsed in a buffer solution of the corresponding temperature and viewed with fluorescence microscopy.

FIG. 11a displays a fluorescence image of the resultant NIPAM squares on PTFE strips (100 µm squares separated by 10 µm) at 20° C. As this was below the lower critical solution temperature (32° C.), both the NIPAM squares and the PTFE background exhibited resistance to the adsorption of the fluorescent protein. When heated to 40° C. (above the lower critical solution temperature) the NIPAM squares became susceptible to protein adsorption, giving rise to clearly observable fluorescence in these regions.

Example 8

Surface-initiated Nitroxide Mediated Graft Polymerization of Styrene onto Free-radical Bearing Pulsed Plasma Polymer Layers of Maleic Anhydride Maleic anhydride (+99%, Aldrich) was plasma polymerized using the same apparatus and general method as described in Example 1. Optimum pulsed plasma film deposition conditions were found to correspond to 5 W continuous wave bursts lasting 20 µs ($t_{on}$), interspersed by off-periods ($t_{off}$) of 1200 µs. Deposition duration was typically 30 minutes.

The concentration of radical sites on the surface of the maleic anhydride pulsed plasma polymer (MA) was determined using the DPPH method (DPPH: 1,1-diphenyl-2-picrylhydrazyl, 95%, Aldrich). Firstly, a glass slide (BDH) coated with the plasma polymer film was placed into a glass tube containing 5 ml of DPPH dissolved in toluene solution ($1 \times 10^{-4}$ mol dm$^{-3}$). The tube was then sealed and subjected to several freeze-pump-thaw cycles prior to heating at 70° C. for 3 hours. The DPPH molecules consumed by surface radicals were quantified by measuring the difference in absorbance at 520 nm between a control and the coated sample using a spectrophotometer (PYE Unicam PV8600). The DPPH assay results revealed the presence of a significant number of free radicals on the MA plasma polymer surface.

Living nitroxide-mediated graft polymerisation onto the radical bearing surfaces comprised: a mixture of styrene (5 ml, 43.7 mmol, +99%, Aldrich), recrystallized benzoyl peroxide (0.021 g, 0.087 mmol, 70%, Aldrich, purified by dissolving in chloroform and recrystallized by adding an equivalent amount of methanol) and 2,2,6,6, tetramethylpiperidin-1-oxyl (TEMPO, 0.0177 g, 0.11 mmol) (98%, Aldrich) being loaded into a glass tube containing a plasma polymer coated silicon wafer in a molar ratio of 500:1:1.3. The tube was then subjected to several freeze-pump-thaw cycles, sealed under vacuum, and heated at 120° C. for 16 hours. Upon cooling, the silicon wafer was removed from the solidified reaction mixture by dissolving in dichloromethane, and then continuously washed in dichloromethane using a soxhlet extractor for 16 hours, prior to finally drying in flowing nitrogen.

Infrared analysis confirmed a high level of structural retention of the anhydride groups in the pulsed plasma deposited MA layers. The following characteristic cyclic anhydride absorbances were identified: asymmetric and symmetric C=O stretching (1861 cm$^{-1}$ and 1796 cm$^{-1}$), cyclic conjugated anhydride group stretching (1245 cm$^{-1}$), C—O—C stretching vibrations (1098 cm$^{-1}$), and cyclic unconjugated anhydride group stretching (938 cm$^{-1}$), Table 7.

TABLE 7

The occurrence of FTIR peaks within films of pulsed-plasma polymerised maleic anhydride (MA), and MA subsequently graft polymerised with polystyrene (MA + PS):

| Assignment | MA | MA + PS |
|---|---|---|
| C=O anhydride stretch, 1850, 1780 cm$^{-1}$ | * | * |
| C=O imide stretch, 1780, 1710 cm$^{-1}$ | | |
| C=O acid stretch, 1715-1700 cm$^{-1}$ | | * |
| amide I, 1670 cm$^{-1}$ | | |
| aromatic ring stretch, 1600 cm$^{-1}$ | | * |
| amide II, 1580-1575 cm$^{-1}$ | | |
| aromatic ring stretch, 1492, 1453 cm$^{-1}$ | | * |
| COO$^-$, 1435-1390 cm$^{-1}$ | | |
| anhydride ring, 1248-1242 cm$^{-1}$ | * | * |
| C—O—C stretch, 1100-1050 cm$^{-1}$ | * | * |
| anhydride ring, 965-935 cm$^{-1}$ | * | * |
| alkyl double-bond, 1100, 1050 cm$^{-1}$ | | |

The high resolution C(1s) XPS spectra of the maleic anhydride pulsed plasma polymer could be fitted to five different carbon environments: hydrocarbon (CHx~285.0 eV), carbon singly bonded to an anhydride group (C—C(O)=O~285.7 eV), carbon singly bonded to oxygen (=C—O~286.6 eV), carbon doubly bonded to oxygen (O—C—O/—C=O~287.9 eV), and anhydride groups (O=C—O—C=O~289.4 eV). The optimum plasma deposition conditions gave rise to 58% of all surface carbon atoms belonging to cyclic anhydride repeat units (on the basis of the C(1s) envelope peak fitting).

TEMPO mediated living radical polymerization of styrene from the surface of the MA pulsed plasma polymer films for 16 hours resulted in 36±15 nm thick films of polystyrene. Infrared spectroscopy showed the characteristic polystyrene peaks superimposed on the maleic anhydride pulsed plasma polymer background, Table 7.

In order to demonstrate the living nature of the nitroxide (i.e. TEMPO) mediated surface polymerization, a living radical and a thermally polymerised polystyrene control film were placed into separate tubes containing a mixture of vinylbenzyl chloride (5 ml, 35.5 mmol, 97%, Aldrich), benzoyl peroxide (0.021 g) and TEMPO (0.0177 g) and subjected to the aforementioned polymerization procedure in order to produce a surface grafted polystyrene-polyvinylbenzylchloride block co-polymer. The resultant graft block co-polymer layer on TEMPO terminated polystyrene grown from MA had a thickness of 18 nm after 16 hours. The XPS C(1s) envelope for the co-polymer graft resembled that of polyvinylbenzyl chloride (7% chlorine was detected at the surface). In addition, new infrared absorbances at 1511 $cm^{-1}$ (phenyl ring stretch) and 1266 $cm^{-1}$ ($CH_2$—Cl wag) confirmed the presence of polyvinylbenzyl chloride. By contrast, XPS of conventional thermally grown polystyrene on MA, which had then been subjected to living polymerization conditions for graft polymerisation of vinylbenzylchloride, did not reveal any surface chlorine and the overall film thickness remained unchanged (i.e. the thermally grown film was not living).

Example 9

The Enhancement by Amine Derivatisation of Surface-Initiated Nitroxide Mediated Graft Polymerization of Styrene onto Pulsed Plasma Polymerised Maleic Anhydride Samples coated with a pulsed plasma polymer of maleic anhydride (MA) were prepared using the procedure described in Example 8. Subsequent derivatisation with amines firstly comprised the MA functionalized silicon wafers being placed inside a glass reactor pumped by a 30 L $min^{-1}$ rotary pump attached to a liquid nitrogen cold trap. This system was then evacuated to a base pressure of $2·10^{-3}$ mbar, valved-off from the pump, and the anhydride coated substrates exposed to either propylamine (+99%, Aldrich) or allylamine (+98%, Aldrich) vapor at a pressure of approximately 200 mbar for 30 min. Upon completion of derivatization, any excess reagent was pumped away and the chamber vented to atmosphere.

Subsequent conversion of amide linkages to imide groups via ring closure was achieved by placing the functionalized substrate in a vacuum oven at 120° C. for 1 hour.

The reaction of MA with propylamine or allylamine gave rise to the appearance of carboxylic acid, amide I, and amide II bands in the FTIR spectra, Table 8. Weak features corresponding to $COO^-$ groups indicated the presence of acid-base interactions. Heating the amine derivatized films to 120° C. under vacuum gave rise to cyclic imide group formation, evidenced by the strong absorbances at 1780 $cm^{-1}$ and 1710 $cm^{-1}$.

TABLE 8

The occurrence of FTIR peaks within films of pulsed-plasma polymerised maleic anhydride (MA), derivatised with amines (MA + amine), heated in a vacuum oven (120° C.), and graft polymerized with polystyrene (PS):

| Assignment | MA + Amine | MA + amine 120° C. | MA + amine + PS | PP + amine 120° C. + PS |
|---|---|---|---|---|
| C = 0 anhydride stretch, 1850, 1780 $cm^{-1}$ | | | | |
| C = 0 imide stretch, 1780, 1710 $cm^{-1}$ | | * | * | * |
| C = 0 acid stretch, 1715-1700 $cm^{-1}$ | * | * | * | * |
| amide I, 1670 $cm^{-1}$ | * | * | * | * |
| aromatic ring stretch 1600 $cm^{-1}$ | | | * | * |
| amide II, 1580-1575 $cm^{-1}$ | * | * | * | * |
| aromatic ring stretch 1492, 1453 $cm^{-1}$ | | | * | * |
| $COO^-$, 1435-1390 $cm^{-1}$ | * | * | * | * |
| anhydride ring, 1248-1242 $cm^{-1}$ | | | | |
| C—O—C stretch, 1100-1050 $cm^{-1}$ | | | | |
| anhyydride ring, 965-935 $cm^{-1}$ | | | | |
| alkyl double bond, 1100, 1050 $cm^{-1}$ | | | | |

The functionalization of MA by the amines was further confirmed by XPS analysis which demonstrated the presence of carbon, oxygen and nitrogen atoms following derivatization, Table 9. Inspection of the N(1s) peak revealed a major component at 399.8 eV which could be attributed to the formation of C(=O)—N(H)—C groups. A smaller component at 401.5 eV belonged to C—$NH_3^+$ centres. Upon imidization, there was a small decrease in the total N(1s) signal (due to removal of acid-base interactions), and the N(1s) shoulder at 401.5 eV lost intensity relative to the component at 399.8 eV (also attributable to loss of acid-base interactions).

The concentration of radical sites on the surface of the MA pulsed plasma polymer, before and after derivatisation with amines and their subsequent conversion to imides, was determined using the DPPH method described in Example 8.

Contact angle analysis showed an increase in hydrophilicity (acid-base interactions) upon amine derivatization of the maleic anhydride pulsed plasma polymer films, and a reversal to relative hydrophobicity (removal of acid-base interactions) upon imide formation, Table 9.

TABLE 9

Surface elemental abundances (XPS), contact angle (C.A.) and radical densities of functionalized and grafted plasma deposited maleic anhydride (MA) films:

| Surface | % C | % O | % N | % Si | C.A./° | Radical density x $10^{-9}$ Mol $cm^{-2}$ |
|---|---|---|---|---|---|---|
| MA | 64 | 36 | 0 | 0 | 45 | 3.0 |
| MA/propylamine | 66 | 21 | 13 | 0 | 21 | 20 |
| MA/propylamine/ 120° C. | 68 | 22 | 10 | 0 | 65 | 12 |
| MA/allylamine | 66 | 21 | 12 | 0 | 16 | 9.5 |
| MA/allylamine/ 120° C. | 68 | 22 | 10 | 0 | 65 | 6.4 |

Thickness measurements of the pulsed plasma polymer films indicated swelling upon amine derivatization. For a typical 100 nm thick MA pulsed plasma polymer film, a 39% rise in thickness was noted following propylamine exposure and a 22% rise after allylamine exposure, Table 10. Subsequent imidization caused these films to revert to approximately their original thicknesses.

Living radical polymerization of polystyrene for 16 hours onto the amine derivatised surfaces resulted in the generation of grafted films of over 500 nm thickness (propylamine derivatized: 611±90 nm, and allylamine derivatized: 536±79 nm), Table 10. Conversion of the propylamine treated surfaces to imide groups prior to living radical styrene polymerization resulted in grafted films that were found to be of comparable thickness to the amide (552±81 nm), Table 10. The imidized allylamine surface yielded a grafted film thickness comparable to the native maleic anhydride plasma polymer (21±3 nm), Table 10.

TABLE 10

Reflectometry film thickness measurements of grafted PS films on maleic anhydride (MA), and MA derivatised with propylamine (PA) and allylamine (AA). In the case of graft styrene polymerization the initial plasma polymer film thickness has been subtracted.

| | Thickness/nm (growth rate/h) | | |
|---|---|---|---|
| Surface | MA | MA + PA | MA + AA |
| Before grafting | 100 ± 15 | 139 ± 23 39% swelling | 122 ± 15 22% swelling |
| Amide/PS graft (16 h) | 36 ± 15 (2.3) | 611 ± 90 (38.2) | 536 ± 79 (33.5) |
| Imide/PS graft (16. h) | — | 552 ± 81 (34.5) | 21 ± 3.1 (1.3) |

Derivatisation of the MA plasma polymer with amines hence lead to grafted films an order of magnitude thicker than previously achieved. This was in marked contrast to other reported nitroxide mediated "living" surface initiated free radical graft polymerisations. This enhancement is thought to be caused by the large increase in the number of accessible radical centers yielded by amine derivatisation, Table 9. The swelling of the MA pulsed plasma polymer film during amine vapor exposure gives rise to a greater number of accessible to free radical sites within the sub-surface of the plasma polymer layer for the subsequent graft polymerisation step.

The role of subsurface radical sites was confirmed by the dependence of the thickness of the grafted polystyrene (PS) film on the initial thickness of the MA pulsed plasma polymer. Amine derivatisation of a range of thicknesses of plasma polymer, followed by living polymerization onto these films, resulted in correspondingly thick polystyrene layers. Thus proving that graft polymerization is not restricted to the outermost surface, FIG. 12b. Variation of the PS graft polymerization time from 1 to 16 hours for the propyl and allylamine derivatised surfaces resulted in a linear plot of film thickness against time, revealing the polymerization rate to be constant with no significant termination over the reaction time span (i.e. "living"), FIG. 12a. The non linearity at the start is due to concurrent induction of the polymerization reaction and imidization (de-swelling) of the amine derived films.

The present invention therefore provides a novel, substrate-independent method for producing polymer coatings by surface initiated polymerization from a plasma deposited coating on the substrate. This allows the polymer coatings to be created on substrates where previously the formation of such a coating would not be possible due to the type of material from which the coating is formed and for the plasma deposition to be used to control the coating formed.

The invention claimed is:

1. A method for applying a surface initiated polymer to a substrate, said method comprising steps as follows:
   forming a precursor coating onto at least part of a surface of the substrate using plasma polymerization to deposit a polymer coating on the substrate;
   then performing a procedure to form a polymer layer grown on the coating using initiator groups from the coating; and
   wherein living polymer brushes are grafted from the substrate coating by using Atom Transfer Radical Polymerization (ATRP) from a pulsed plasma polymer coating of 4-vinylbenzyl chloride, 2-bromoethylacrylate or allyl bromide.

2. The method according to claim 1 wherein the plasma polymers layer requires further derivatisation before the procedure is performed.

3. The method according to claim 2 wherein the derivatisation is required to allow the coating to initiate polymer growth.

4. The method according to claim 2 wherein the derivatisation of the plasma polymer layer produces an enhanced rate of graft polymerization.

5. The method according to claim 4 wherein the plasma polymer is generated by subjecting a coating-forming precursor to an ionizing electric field under low pressure conditions of between 0.01 and 10 mbar.

6. The method according to claim 5 wherein deposition occurs when excited species generated by the action of the electric field upon the precursor polymerize in the gas phase and reacts with the substrate surface to form a growing polymer coating.

7. The method according to claim 5 wherein the electric field is pulsed in a predetermined sequence.

8. The method according to claim 7 wherein the sequence is that the plasma is on for 20 μs and off for from 1000 μs to 20000 μs.

9. The method according to claim 1 wherein polymerization using vapors of compounds initiates "grafting from" polymerization, at pressures of from 0.01 to 10 mbar.

10. The method according to claim 9 wherein the pressure is at about 0.2 mbar.

11. The method according to claim 9 wherein a glow discharge is ignited by applying a high frequency voltage of at least 13 MHz.

12. The method according to claim 1 wherein the plasma deposition of the coating is performed so as to provide a spatial patterned coating application and therefore allows the "grafting from" procedure to be performed in a regio-selective manner.

13. The method according to claim 1 wherein the plasma comprises the plasma polymer coating precursor.

14. The method according to claim 1 wherein the plasma comprises the plasma polymer coating precursor and at least one further material.

15. The method according to claim 14 wherein the further material is an inert gas or gases.

16. The method according to claim 14 wherein the further material has the capability to modify and/or be incorporated into the coating forming material and/or the resultant plasma deposited coating.

17. The method according to claim 16 wherein the material is a reactive gas or gases.

18. The method according to claim 17 wherein deposited plasma polymer possesses a transferable halogen group suited to participation in the technique known in the art as Atom Transfer Radical Polymerization (ATRP).

19. The method according to claim 18 wherein surface initiated polymerization proceeds directly upon the plasma polymer coating after an addition of a copper-based catalyst and a desired "grafting from" monomer.

20. A method for applying a surface initiated polymer to a substrate, said method comprising steps as follows:
- forming a precursor coating onto at least part of a surface of the substrate using plasma polymerization to deposit a polymer coating on the substrate;
- then performing a procedure to form a polymer layer grown on the coating using initiator groups from the coating;
- wherein the plasma polymer coating is derivatised to form specific immobilized-initiator groups required for subsequent participation within the "grafting from" polymerization procedure; and
- wherein the polymer coating is applied in the form of pulsed plasma polymerization of 4-vinylbenzyl chloride or 2-bromoethylacrylate followed by derivatisation to form one or more dithiocarbamate groups.

21. The method according to claim 20 wherein the derivatisation is performed using sodium diethyldithiocarbamate.

22. The method according to claim 20 wherein the dithiocarbamate groups produced by this derivatisation step are capable of initiating the production of quasi-living polymer brushes from a variety of monomers by photochemical surface Iniferter polymerization.

* * * * *